United States Patent
Furukawa et al.

(10) Patent No.: US 10,205,416 B2
(45) Date of Patent: Feb. 12, 2019

(54) ELECTRIC DRIVING APPARATUS AND ELECTRIC POWER STEERING APPARATUS

(71) Applicant: Mitsubishi Electric Corporation, Tokyo (JP)

(72) Inventors: Akira Furukawa, Tokyo (JP); Akihiko Mori, Tokyo (JP); Jiro Okada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/519,214

(22) PCT Filed: Feb. 24, 2015

(86) PCT No.: PCT/JP2015/055129
§ 371 (c)(1),
(2) Date: Apr. 14, 2017

(87) PCT Pub. No.: WO2016/135840
PCT Pub. Date: Sep. 1, 2016

(65) Prior Publication Data
US 2017/0237377 A1    Aug. 17, 2017

(51) Int. Cl.
*G05D 1/00* (2006.01)
*H02P 21/00* (2016.01)
(Continued)

(52) U.S. Cl.
CPC ............ *H02P 25/22* (2013.01); *B62D 5/0463* (2013.01); *H02K 3/28* (2013.01); *H02P 6/16* (2013.01); *H02P 29/028* (2013.01); *H02P 21/00* (2013.01)

(58) Field of Classification Search
CPC ..... B62D 5/0463; H02P 21/00; H02P 29/028; H02P 6/16; H02P 25/22; H02K 3/28
(Continued)

(56) References Cited

U.S. PATENT DOCUMENTS 6,212,646 B1 * 4/2001 Miwa .................. G11C 16/32
711/103
2004/0207349 A1   10/2004 Suzuki
(Continued)

FOREIGN PATENT DOCUMENTS

JP         2614788 B2    5/1997
JP      2004-248377 A    9/2004
(Continued)

OTHER PUBLICATIONS

Communication dated Oct. 24, 2017 from the Japanese Patent Office in counterpart application No. 2017-501588.
(Continued)

*Primary Examiner* — Bentsu Ro
*Assistant Examiner* — Zemenay Truneh
(74) *Attorney, Agent, or Firm* — Sughrue Mion, PLLC; Richard C. Turner

(57) ABSTRACT

A control unit for driving a motor mainly includes an input circuit for inputting various kinds of information pieces, an output circuit for driving the coil windings of the motor, an MPU for calculating a control amount based on the information from the input circuit and outputting a control signal to the output circuit; the control unit has two pieces each of the input circuit, the output circuit, and the, and can supply respective electric currents to the windings of the motor or can cut off the supply; the MPUs each have a CPU incorporated therein, a trigger circuit for a trigger signal having a predetermined period; the two CPUs synchronize at least control commands in accordance with the trigger signal and output the control commands.

12 Claims, 11 Drawing Sheets

(51) Int. Cl.
    *H02P 25/22*     (2006.01)
    *B62D 5/04*     (2006.01)
    *H02K 3/28*     (2006.01)
    *H02P 29/028*     (2016.01)
    *H02P 6/16*     (2016.01)

(58) Field of Classification Search
    USPC .......................................... 318/564, 400.02
    See application file for complete search history.

(56) References Cited

U.S. PATENT DOCUMENTS

| | | |
|---|---|---|
| 2005/0159866 A1 | 7/2005 | Takeuchi et al. |
| 2012/0118662 A1 | 5/2012 | Sakai et al. |
| 2014/0009093 A1* | 1/2014 | Suzuki ................ H02P 21/0096 |
| | | 318/400.02 |

FOREIGN PATENT DOCUMENTS

| | | |
|---|---|---|
| JP | 3839358 B2 | 11/2006 |
| JP | 2007-244009 A | 9/2007 |
| JP | 2010-130793 A | 6/2010 |
| JP | 2010-288420 A | 12/2010 |
| JP | 5396948 B2 | 1/2014 |

OTHER PUBLICATIONS

International Search Report of PCT/JP2015/055129, dated May 26, 2015. [PCT/ISA/210].

* cited by examiner

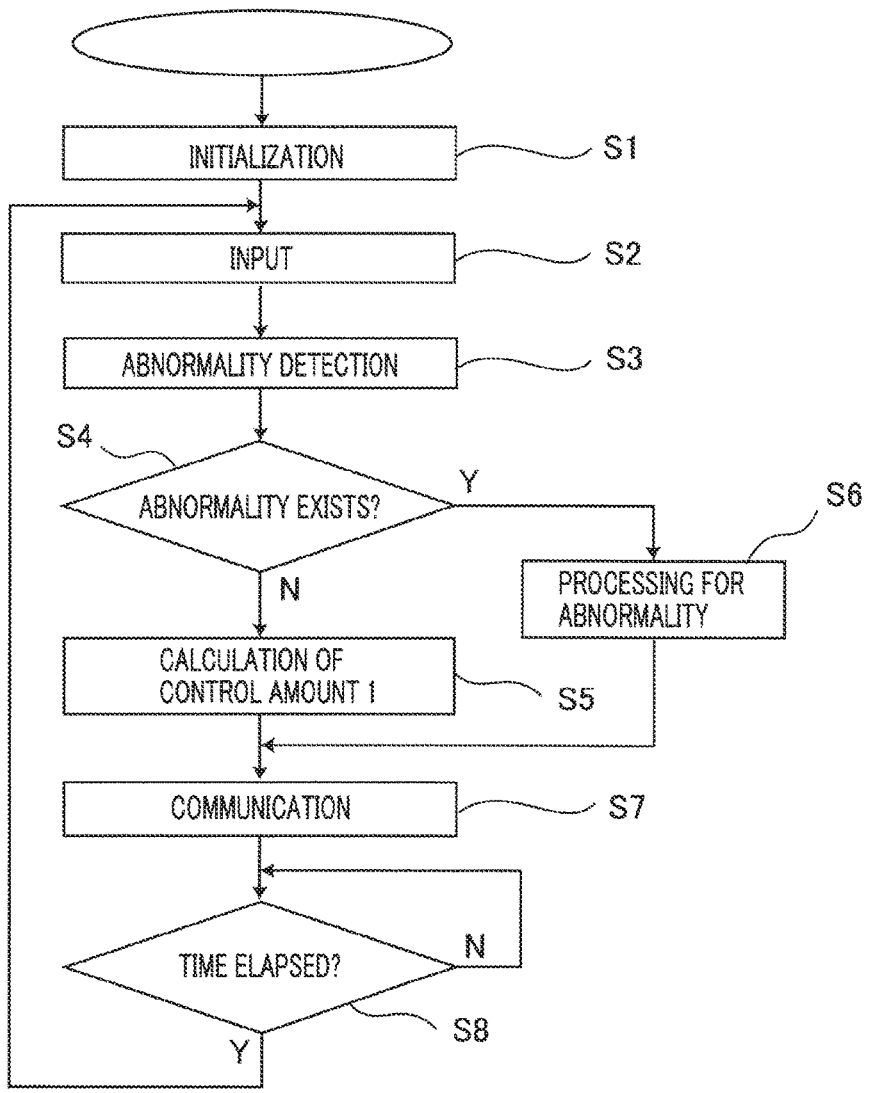

though they are shorter than the currend the switching device may current sensor and hence no sufficient-accuracy current

ELECTRIC DRIVING APPARATUS AND ELECTRIC POWER STEERING APPARATUS

CROSS REFERENCE TO RELATED APPLICATIONS

This application is a National Stage of International Application No. PCT/JP2015/055129 filed Feb. 24, 2015, the contents of all of which are incorporated herein by reference in their entirety.

TECHNICAL FIELD

The present invention relates to an electric driving apparatus in which, considering redundant systems for a control unit, a plurality of microprocessor units (referred to as an MPU, hereinafter) are provided, and particularly to an electric driving apparatus in which a plurality of microprocessor units collaborate with one another so as to control the output control amount of the control unit and to an electric power steering apparatus utilizing the electric driving apparatus.

BACKGROUND ART

As is well known, as an electric driving apparatus that drives a driving subject by use of a motor, which is a driving source, there exists, for example, an electric power steering apparatus mounted in a vehicle. In the case of this electric power steering apparatus, a control unit drives a motor in such a way that the motor generates output torque corresponding to steering torque exerted on the steering by a vehicle driver, and then the output torque of the motor is exerted on the steering shaft so as to assist the driver's steering.

In general, the control unit for controlling the motor of the electric power steering apparatus usually includes a three-phase inverter circuit The three-phase inverter circuit is provided with U-phase, V-phase, and U-phase high-voltage-side switching devices and U-phase, V-phase, and W-phase low-voltage-side switching devices; in each of the phases, the high-voltage-side switching device and the low-voltage-side switching device are connected in series with each other so as to form a switching arm for each phase. Then, the high-voltage-side switching device in the switching arm for each phase is connected with the high-voltage-side terminal of a DC power source; the low voltage-side switching device in the switching arm for each phase is connected with the low-voltage-side terminal of the DC power source, i.e., the ground potential portion of a vehicle. The each-phase output terminal of the three-phase inverter circuit is led out from the series connection point between the high-voltage-side switching device and the low-voltage-side switching device in the each-phase switching arm.

Meanwhile, the motor of the electric power steering apparatus is formed of, for example, a three-phase brushless motor; each-phase input terminal of the three-phase stator windings provided in the stator is connected with the corresponding each-phase output terminal of the three-phase inverter circuit. In general, such a three-phase motor is provided with a rotor having two or more magnetic poles that are each formed of a permanent magnet.

The high-voltage-side switching device and the low-voltage-side switching device of the each-phase switching arm in the foregoing three-phase inverter circuit are on/off-controlled based on a predetermined pattern and output three-phase electric power through the foregoing output terminal. When its stator windings are energized by the three-phase electric power outputted from the three-phase inverter circuit, the motor of the electric power steering apparatus generates a rotating magnetic field so as to rotate the rotor having two or more magnetic poles, so that output torque, as a predetermined assist torque, is generated from the output axle of the rotor.

In the case of an electric power steering apparatus to be mounted in a vehicle, it is required to take plentiful measures for a failure in terms of securing the safety of a vehicle. An electric power steering apparatus sensitively responds to a torque ripple in the output torque of the motor; therefore, in terms of the comfortability of a drive, it is required that the output torque of the motor is smooth without pulsating.

As an example of conventional electric power steering apparatus, there exists an electric power steering apparatus in which two groups of stator windings are provided in a single motor and in which there is provided a control unit having two respective inverter circuits that can independently control the two groups of stator windings. The control unit in the conventional electric power steering apparatus has two Micro Processing Units (referred to as MPU, hereinafter), each of which has a Central Processing Unit (referred to as a CPU, hereinafter), and drives these MPUs in such a way that they collaborate with each other so as to control the two inverter circuits; when an abnormality occurs in one of the two inverters, only the other one of the two inverters, which operates normally, continues to drive the motor; moreover, in order to prepare for a failure, the conventional electric power steering apparatus has a double-system and redundant control system in addition to the two inverters (for example, refer to Patent Document 1).

As described above, an electric power steering apparatus sensitively responds to a torque ripple in the output torque of the motor; therefore, it is required that the current-detection accuracy of a current sensor for detecting an electric current that flows in the stator winding of the motor (simply referred to as a motor current, hereinafter) is raised so that high-accuracy feedback control is applied to the motor current. However, in the three-phase inverter circuit, the On time of the low-potential-side switching device of the phase, out of the three phases, in which a maximum current flows maybe shorter than the current-detection time of the current sensor and hence no sufficient-accuracy current detection value may be obtained from the current sensor.

Accordingly, by use of the fact that the sum of the respective currents of the three phases is "0", the current detection value of the phase in which the maximum current flows may be estimated based on the respective current detection values of two other phases. However, when the switching device of the phase in which the maximum current flows performs switching, noise caused by the switching may deteriorate the accuracies of the current detection values of two other phases. Therefore, there has already been disclosed a technology in which when the respective currents of two phases other than the phase in which the maximum current flows are detected, the high-potential-side switching device and the low-potential-side switching device of the phase in which the maximum current flows are held to be on and off, respectively, so that the effect of the noise, caused by the foregoing switching, on the current detection values of the two other phases is reduced (for example, refer to Patent Document 2).

In the case where in an AC rotating electric machine having two or more groups of stator windings, there exists an mutual inductance between the two or more groups of stator windings, the current in one of the stator windings provides an effect to the current in the other one of the stator windings; thus, the respective currents in, voltages across, and torque values of the stator windings are liable to become oscillatory.

Accordingly, for example, there has been disclosed a conventional motor controller in which in the rotating two-axis coordinate system of an AC rotating electric machine, an average voltage command value is obtained based on the difference between an average current command value and the average value of the respective output currents of two or more groups of inverters that are connected in parallel with one another and a difference voltage command value is obtained based on the difference between the respective output currents of the inverters and a difference current command value, in which the average voltage command value and the difference voltage command value in the rotating two-axis coordinate system are restored to the voltage command values for the stator windings, and in which based on the voltage command values, the respective voltages of the stator windings are controlled so that an unbalanced current is reduced (for example, refer to Patent Document 3). In the conventional apparatus, the respective voltages across the windings are controlled based on the respective average current values and the respective difference current values of the two or more groups of inverters, so that interference between the winding groups are prevented.

PRIOR ART REFERENCE

Patent Document

[Patent Document 1] Japanese Patent Publication No. 3839358
[Patent Document 2] Japanese Patent Publication No. 5396948
[Patent Document 3] Japanese Patent Publication No. 2614788

DISCLOSURE OF THE INVENTION

Problems to be Solved by the Invention

In the conventional power steering apparatus disclosed in Patent Document 1, two MPUs are driven in such a way as to collaborate with each other, so that two inverter circuits are controlled; however, it is not clear how the two MPUs, which are main members of the calculation means in the control unit, are driven so as to collaborate with each other so that two inverter circuits are controlled. Provided that in the conventional electric power steering apparatus disclosed in Patent Document 1, a well-known control method is followed, it is not recognized that there is utilized the control method in which two inverter circuits are controlled by driving two MPUs in such a way as to collaborate with each other; therefore, a torque ripple of the motor maybe enlarged, for example, by the mutual interference between the two inverter circuits, and hence the torque of the motor may be deteriorated.

Accordingly, because in the conventional electric power steering apparatus disclosed in Patent Document 1, there exist two groups of stator windings that can generate torque in the output axle of the motor even though the motor has a single output axle, it is required to perform the control, while accurately considering the respective values of currents to be supplied to the two group of stator windings and the difference between the respective phases of the currents. In particular, because there exist two independent MPUs, which are main members of the control unit and are to calculate the control amount, contrivance is required in order to make the two MPUs each perform independent control and to make the two MPUs collaboratively perform control. It is also made possible that only one MPU is utilized and the double system is realized by software; however, in terms of measures for an abnormality, there occurs a large difference between the case where only one MPU is provided and the case where two MPUs are provided; therefore, for the purpose that even when one system is failed, the control of the electric power steering apparatus is continued as long as possible, it is safer to utilize a plurality of MPUs, especially, two MPUs than to utilize only one MPU. In this regard, however, in the case of an MPU formed of two cores in a single package, it can be regarded that two MPUs are provided.

In the conventional electric power steering apparatus disclosed in Patent Document 2, when the respective currents of two phases other than the phase in which the maximum current flows are detected, the high-potential-side switching device and the low-potential-side switching device of the phase in which the maximum current flows are held to be on and off, respectively, so that the effect of the noise, caused by the foregoing switching, on the current detection values of the two other phases is reduced.

However, in the case where two groups of stator windings are provided, it is required to consider not only the effect of switching noise caused by a controller for controlling one of the two groups of stator windings but also the effect of switching noise caused by a controller for controlling the other one of the two groups of stator windings. In other words, in the case where the timing setting is made in such a way that when the current in one stator winding is detected, the controller for controlling the other stator winding performs switching between ON and OFF, the accuracy of detecting the current in the one stator winding is deteriorated due to the effect of the switching noise caused by the controller for the other stator winding, even when the respective controllers for the two groups of windings each implement, the modulation method as disclosed in Patent Document 2.

As described above, in the case of the motor controller disclosed in Patent Document 3, the average voltage command value and the difference voltage command value in the rotating two-axis coordinate system are restored to respective voltage command values for the stator windings; based on the voltage command values, the respective voltages of the stator windings are controlled so that an unbalanced current is reduced, and the voltages of the respective windings are controlled based on the respective average current values and the respective difference current values of the two or more groups of inverters, so that interference between the winding groups are prevented. However, in the case where there exists a large difference between the timing for detecting the current in one stator winding and the timing for detecting the current in the other stator winding, the voltage command values are obtained by use of the average current values or the difference current values obtained from the respective current values with different timings, i.e., the respective current values in different senses; therefore, desired non-interference cannot be accomplished.

Moreover, in the motor controller disclosed in Patent Document 3, because being obtained based on the average voltage command values and the difference voltage command values, the voltage command values for the respective groups of stator windings are not voltage command values that are originally required, when the average voltage command values and difference voltage command values with different timings are utilized. As a result, even when the current outputted from each of the inverters is fed back, high-accuracy feedback control cannot be performed and hence phenomena such as a torque ripple and a noise sound occur. In the case where when two MPUs I n the control unit collaboratively perform control so as to control two inverter circuits, the respective current command values inputted to the two MPUs are different, the respective voltage command values calculated by the MPUs are different, as a matter of course, even when a single and the same current detection value is utilized to calculate the voltage command value; therefore, desired control cannot be performed.

The present invention has been implemented in order to solve the problems in the foregoing conventional apparatus; the objective thereof is to provide an electric driving apparatus that drives a motor through collaboration of two MPUs corresponding to two groups of stator windings and in which when an abnormality occurs in a control system including one of the two MPUs, independent control for each of the stator windings can readily be continued even by only the normal control system including the other one of MPUs.

Moreover, the objective of the present invention is to provide an electric power steering apparatus that generates torque for assisting the steering torque of a vehicle steering system, by use of an electric driving apparatus that drives a motor through collaboration of two MPUs corresponding to two groups of stator windings and in which when an abnormality occurs in a control system including one of the two MPUs, independent control for each of the stator windings can readily be continued even by only the normal control system including the other one of MPUs.

Means for Solving the Problems

An electric driving apparatus according to the present invention has an electric motor and a control unit for driving the electric motor, the electric driving apparatus is characterized in that the electric motor has a single rotor and a stator having two independent groups of stator windings, in that the control unit includes an input circuit that inputs a plurality of information pieces to be utilized in calculation, two independent groups of output circuits for driving the two groups of stator windings, and two Micro Processing Units that outputs to the output circuits control signals based on control amounts calculated based on the information pieces inputted to the input circuit, in that the two groups of output circuits can supply electric currents to at least the two groups of stator windings of the electric motor or can cut off the supply of electric current, in that the two Micro Processing Units have respective CPUs, can communicate with each other, and have respective abnormality detection functions of detecting abnormalities in the two groups of output circuits and the two groups of stator windings; in the case where an abnormality in one of the two groups of output circuits or one of the two groups of stator windings is detected, control is continued by use of the other one of the two groups of output circuits or the other one of the two groups of stator, which is normal, and in that based on a trigger signal having a predetermined period, outputted from a trigger circuit, the respective CPUs included in the two Micro Processing Units synchronize at least control commands and output the synchronized control commands to the two groups of output circuits.

An electric power steering apparatus according to the present invention generates torque for assisting steering torque for a vehicle steering system and is characterized in that the foregoing electric driving apparatus generates torque for assisting steering torque.

Advantage of the Invention

An electric driving apparatus according to the present invention drives a motor through collaboration of two MPUs corresponding to two groups of stator windings; when an abnormality occurs in a control system including one of the two MPUs, independent control for each of the stator windings can readily be continued even by only the normal control system including the other one of MPUs.

Moreover, the present invention makes it possible to obtain an electric power steering apparatus in which a motor is driven through collaboration of two MPUs corresponding to two groups of stator windings and in which when an abnormality occurs in a control system including one of the two MPUs, independent control for each of the stator windings can readily be continued even by only the normal control system including the other one of MPUs.

BRIEF DESCRIPTION OF THE DRAWINGS

FIG. 4 is a main flowchart representing the operation of a CPU in the electric driving apparatus according to Embodiment 1 of the present invention;

BEST MODE FOR CARRYING OUT THE INVENTION

Embodiment 1

Figure 1:
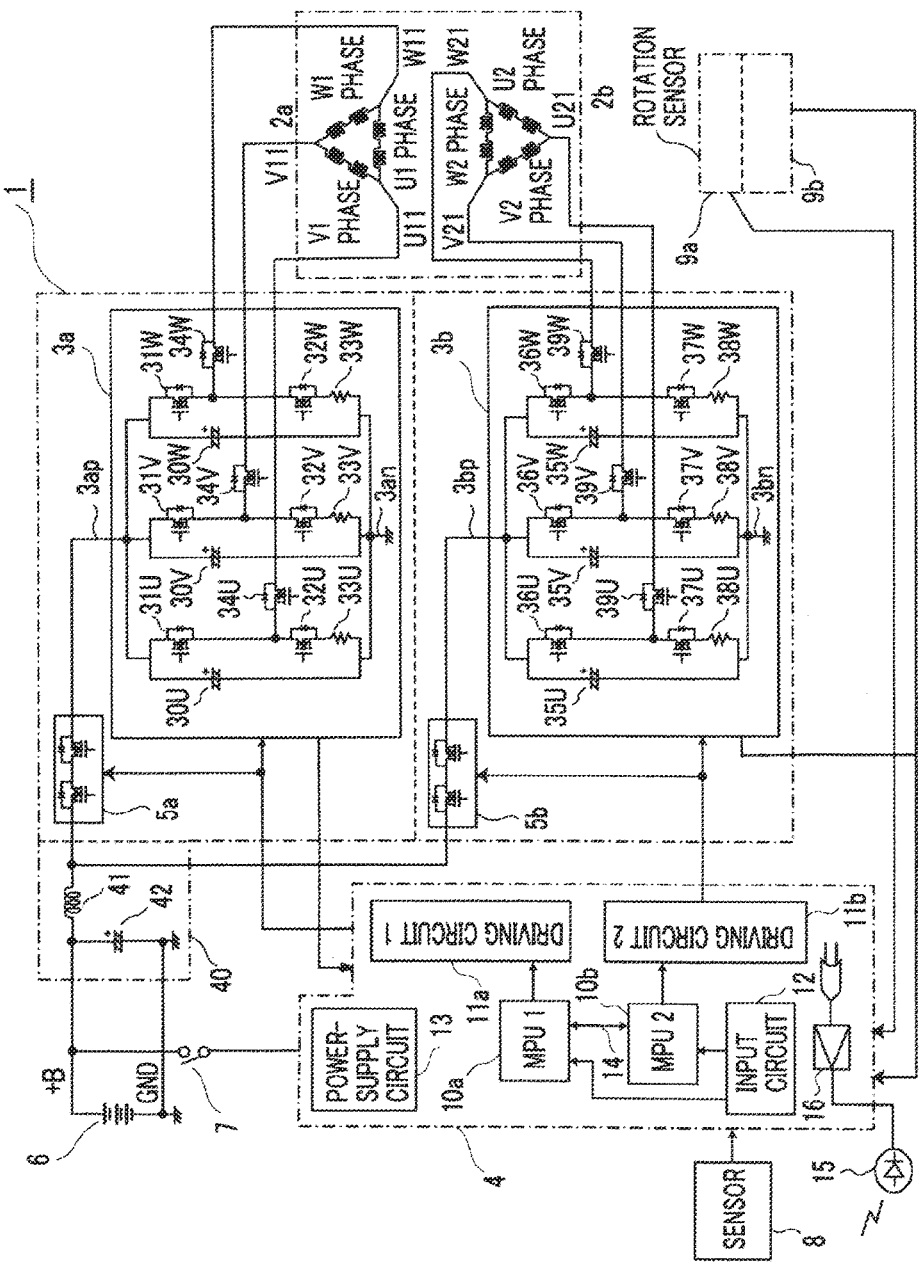
FIG. 1 is a circuit configuration diagram of an electric driving apparatus according to Embodiment 1 of the present invention.

Hereinafter, an electric driving apparatus according to Embodiment 1 of the present invention will be explained in detail with reference to the drawings. FIG. 1 is a circuit configuration diagram of an electric driving apparatus according to Embodiment 1 of the present invention; FIG. 1 represents the case where the electric driving apparatus is configured as an electric power steering apparatus. In FIG. 1, an electric power steering apparatus 100 includes a control unit 1, an electric motor (simply referred to as a motor, hereinafter) 2 formed of a three-phase brushless motor or the like, a control circuit unit 4, a first rotation sensor 9a, and a second rotation sensor 9b.

The control unit 1 has double redundant systems that are configured in the same manner; the control unit 1 includes the control circuit unit 4 equipped with a first MPU 10a and a second MPU 10b, a first inverter circuit 3a, a second inverter circuit 3b, a first power-source relay 5a connected with the high-voltage DC terminal of the first inverter circuit 3a, and a second power-source relay 5b connected with the high-voltage DC terminal of the second inverter circuit 3b. Each of the first inverter circuit 3a and the second inverter circuit 3b is a three-phase inverter circuit formed of a three-phase bridge circuit. A battery 6 mounted in a vehicle supplies a DC power source to the control unit 1; by means of an ignition switch 7, a DC power source from the battery 6 is applied to the control circuit unit 4 by way of a power-supply circuit 13. Moreover, information pieces, for example, from a torque sensor that is mounted in the vicinity of a handwheel and detects steering torque, a speed sensor that detects the traveling speed of a vehicle, and the like are inputted from a sensor 8 to the control circuit unit 4.

The first inverter circuit 3a includes U-phase, V-phase, and W-phase arms that are connected in parallel with one another. The U-phase arm is formed of a series connection member consisting of a U-phase upper arm and a U-phase lower arm; the V-phase arm is formed of a series connection member consisting of a V-phase upper arm and a V-phase lower arm; the W-phase arm is formed of a series connection member consisting of a W-phase upper arm and a W-phase lower arm.

In the first inverter circuit 3a, the U-phase upper arm has a U-phase upper arm switching device 31U; the U-phase lower arm has a U-phase lower arm switching device 32U; the V-phase upper arm has a V-phase upper arm switching device 31V; the V-phase lower arm has a V-phase lower arm switching device 32V; the W-phase upper arm has a W-phase upper arm switching device 31W; the W-phase lower arm has a W-phase lower arm switching device 32W.

In the first inverter circuit 3a, shunt resistors 33U, 33V, and 33W for detecting an electric current are connected in series with the U-phase lower arm switching device 32U, the V-phase lower arm switching device 32V, and the W-phase lower arm switching device 32W, respectively. Noise suppression capacitors 30U, 30V, and 30W are connected in parallel with the U-phase arm, the V-phase arm, and the W-phase arm, respectively. In addition, it may be allowed that the shunt resistors are disposed not in ail of the three phases but in two specific phases among the three phases; or it may be allowed that only a single shunt resistor is disposed in the bus bar of the battery line.

As is the case with the first inverter circuit 3a, the second inverter circuit 3b includes U-phase, V-phase, and W-phase arms that are connected in parallel with one another. The U-phase arm is formed of a series connection member consisting of a U-phase upper arm and a U-phase lower arm; the V-phase arm is formed of a series connection member consisting of a V-phase upper arm and a V-phase lower arm; the W-phase arm is formed of a series connection member consisting of a W-phase upper arm and a W-phase lower arm.

In the second inverter circuit 3b, the U-phase upper arm has a U-phase upper arm switching device 36U; the U-phase lower arm has a U-phase lower arm switching device 37U; the V-phase upper arm has a V-phase upper arm switching device 36V; the V-phase lower arm has a V-phase lower arm switching device 37V; the W-phase upper arm has a W-phase upper arm switching device 36W; the W-phase lower arm has a W-phase lower arm switching device 37W.

In the second inverter circuit 3b, shunt resistors 38U, 38V, and 38W for detecting an electric current are connected in series with the U-phase lower arm switching device 37U, the V-phase lower arm switching device 37V, and the W-phase lower arm switching device 37W, respectively. Noise suppression capacitors 35U, 35V, and 35W are connected in parallel with the U-phase arm, the V-phase arm, and the W-phase arm, respectively. In addition, it may be allowed that the shunt resistors are disposed not in all of the three phases but in two specific phases among the three phases; or it may be allowed that only a single shunt resistor is disposed in the bus bar of the battery line.

The motor 2 has two groups of stator windings, i.e., a first stator winding 2a and a second stator winding 2b in the stator thereof. The first stator winding 2a is formed of a three-phase stator winding including U1-phase, V1-phase, and W1-phase windings that are Δ-connected. The second stator winding 2b is formed of a three-phase stator winding including U2-phase, V2-phase, and W2-phase windings that are Δ-connected. The rotor (not illustrated in FIG. 1) of the motor 2 has a plurality of magnetic-field poles formed of permanent magnets, as described later.

The motor 2 is not necessarily a brushless motor having a three-phase delta-connected stator winding; it may have a three-phase star-connected stator winding; moreover, it may not necessarily be a three-phase motor but be a motor of two or more phases other than three phases.

The mutual connection point between the U1-phase winding and the V1-phase winding of the first stator winding 2a is connected, through the U-phase motor relay switching device 34U, with the mutual connection point between the U-phase upper arm switching device 31U and the U-phase lower arm switching device 32U of the first inverter circuit 3a. The mutual connection point between the V1-phase winding and the W1-phase winding of the first stator winding 2a is connected, through the V-phase motor relay switching device 34V, with the mutual connection point between the V-phase upper arm switching device 31V and the V-phase lower arm switching device 32V of the first inverter circuit 3a. The mutual connection point between the W1-phase winding and the U1-phase winding of the first stator winding 2a is connected, through the W-phase motor relay switching device 34W, with the mutual connection point between the W-phase upper arm switching device 31W and the W-phase lower arm switching device 32W of the first inverter circuit 3a.

The mutual connection point between the U2-phase winding and the V2-phase winding of the second stator winding 2b is connected, through the U-phase motor relay switching device 39U, with the mutual connection point between the U-phase upper arm switching device 36U and the U-phase lower arm switching device 37U of the second inverter circuit 3b. The mutual connection point between the V2-phase winding and the W2-phase winding of the second stator winding 2b is connected, through the V-phase motor relay switching device 39V, with the mutual connection point between the V-phase upper arm switching device 36V and the V-phase lower arm switching device 37V of the second inverter circuit 3b. The mutual connection point between the W2-phase winding and the U2-phase winding of the second stator winding 2b is connected, through the W-phase motor relay switching device 39W, with the mutual connection point between the W-phase upper arm switching device 36W and the W-phase lower arm switching device 37W of the second inverter circuit 3b.

The positive-polarity DC terminal 3ap of the first inverter circuit 3a is connected with the positive-polarity terminal of the battery 6 mounted in the vehicle, by way of the first power-source relay 5a formed of switching devices and a smoothing circuit 40 including a smoothing reactor 41 and a smoothing capacitor 42. Similarly, the positive-polarity DC terminal 3bp of the second inverter circuit 3b is connected with the positive-polarity terminal of the battery 6 mounted in the vehicle, by way of the second power-source relay 5b formed of switching devices and the smoothing circuit 40. Each of the negative-polarity DC terminal 3an of the first inverter circuit 3a and the negative-polarity DC terminal 3bn of the second inverter circuit 3b is connected with the negative-polarity terminal of the battery 6, by way of the ground potential position of the vehicle.

It may be allowed that the switching devices of the first power-source relay 5a are included in the first inverter circuit 3a; it may be allowed that the switching devices of the second power-source relay 5b are included in the second inverter circuit 3b.

The first inverter circuit 3a and the second inverter circuit 3b each have a single and the same circuit configuration and can independently supply respective electric currents to the first stator winding 2a and the second stator winding 2b of the motor 2.

The control circuit unit 4 has the power-supply circuit 13 connected with the positive-polarity terminal of the battery 6 by way of the ignition switch 7, the first MPU 10a, the second MPU 10b, a first driving circuit 11a, a second driving circuit 11b, an input circuit 12 to which various kinds of information pieces from the sensor 8 are inputted, and a notification output circuit 16 that activates a notification means 15 such as a lamp when an abnormality occurs in the control circuit unit 4 or the like.

The first driving circuit 11a provides respective driving signals to the switching devices 31U, 31V, 31W, 32U, 32V, and 32W of the first inverter circuit 3a so as to drive these switching devices. The second driving circuit 11b provides respective driving signals to the switching devices 36U, 36V, 36W, 37U, 37V, and 37W of the second inverter circuit 3b so as to drive these switching devices.

The sensor 8 collectively denotes various kinds of sensors, described later; the information pieces from the sensor 8 include, for example, information pieces from a torque sensor that is mounted in the vicinity of a handwheel and detects steering torque, a speed sensor that detects the traveling speed of a vehicle, and the like, the respective potential differences across the shunt resistors 33U, 33V, and 33W of the first inverter circuit 3a, the respective potential differences across the shunt resistors 38U, 38V, and 38W of the second inverter circuit 3b, the respective inter-terminal voltages of the first stator winding 2a of the motor 2, and the respective inter-terminal voltages of the second stator winding 2b; the sensor 8 transmits these information pieces to the input circuit 12, and then the input circuit 12 transmits them to the first MPU 10a and the second MPU 10b.

Based on the information pieces transmitted through the input circuit 12 from the sensor 8, the first MPU 10a calculates a target current value to be supplied to the first stator winding 2a of the motor 2, calculates respective differences between the calculated target current value and the respective potential differences across the shunt resistors 33U, 33V, and 33W of the first inverter circuit 3a, and controls the output of a first output circuit including the first driving circuit 11a and the first inverter circuit 3a, based on the differences, in such a way as to perform feedback control; as a result, a desired motor current is supplied to the first stator winding 2a.

Based on the information pieces transmitted through the input circuit 12 from the sensor 8, the second MPU 10b calculates a target current value to be supplied to the second stator winding 2b of the motor 2, calculates respective differences between the calculated target current value and the respective potential differences across the shunt resistors 38U, 38V, and 38W of the second inverter circuit 3b, and controls the output of a second output circuit including the second driving circuit 11b and the second inverter circuit 3b, based on the differences, in such a way as to perform feedback control; as a result, a desired motor current is supplied to the second stator winding 2b.

The motor 2 generates desired assist torque based on the respective motor currents supplied to the first stator winding 2a and the second stator winding 2b and assists the steering power of a driver.

Through the first driving circuit 11a, the first MPU 10a can control the switching devices of the first power-source relay 5a, the U-phase motor relay switching device 34U, the V-phase motor relay switching device 34V, and the W-phase motor relay switching device 34W in the first inverter circuit 3a, and the switching devices 31U, 31V, 31W, 32U, 32V, and 32W for the first stator winding 2a. When the first power-source relay 5a is turned off, supply of an electric current from the first inverter circuit 3a to the first stator winding 2a of the motor 2 is cut off. When the U-phase motor relay switching device 34U, the V-phase motor relay switching device 34V, or the W-phase motor relay switching device 34W in the first inverter circuit 3a is turned off, supply of an electric current to the winding of the corresponding phase in the first stator winding 2a of the motor 2 can independently be cut off.

Through the second driving circuit 11b, the second MPU 10b can control the switching devices of the second power-source relay 5b, the U-phase motor relay switching device 34U, The V-phase motor relay switching device 34V, and the W-phase motor relay switching device 34W in the first inverter circuit 3a, and the switching devices 36U, 36V, 36W, 37U, 37V, and 37W for the second stator winding 2b. When the first power-source relay 5a is turned off, supply of an electric current from the first inverter circuit 3a to the first stator winding 2a of the motor 2 is cut off. When the U-phase motor relay switching device 34U, the V-phase motor relay switching device 34V, or the W-phase motor relay switching device 34W in the first inverter circuit 3a is turned off, supply of an electric current to the winding for the corresponding phase in the first stator winding 2a of the motor 2 can independently be cut off.

The first MPU 10a has an abnormality detection function of detecting an abnormality in the first inverter circuit 3a, the first stator winding 2a of the motor 2, or the like, based on the various information pieces inputted from the sensor 8; when any abnormality is detected, for example, the first MPU 10a turns off the switching device, corresponding to the winding of a predetermined phase, among the first motor relay switching devices 34U, 34V, and 34W in order to cut off only supply of the electric current for the winding, of the predetermined phase, in the first stator winding 2a, or turns off the first power-source relay 5a, depending on the abnormality.

Similarly, the second MPU 10b has an abnormality detection function of detecting an abnormality in the second inverter circuit 3b, the second stator winding 2b of the motor 2, or the like, based on the various information pieces inputted from the sensor 8; when any abnormality is detected, for example, the second MPU 10b turns off the switching device, corresponding to the winding of a predetermined phase, among the second motor relay switching devices 39U, 39V, and 39W in order to cut off only supply of the electric current for the winding, of the predetermined phase, in the second stator winding 2b, or turns off the second power-source relay 5b, depending on the abnormality.

Moreover, when the first and second MPUs 10a and 10b each detect an abnormality, as described above, at least one of the first and second MPUs 10a and 10b outputs a command for, for example, lighting a lamp as the notification means 15.

As described above, the motor 2 is a brushless motor having two groups of three-phase delta-connected stator windings and a plurality of magnetic-field poles in the rotor thereof. The motor 2 is equipped with the first rotation sensor 9a and the second rotation sensor 9b for detecting the rotation position of the rotor. Two sensors, i.e., the first rotation sensor 9a and the second rotation sensor 9b are provided in order to secure the redundant system in the control system; respective rotation position information pieces, from the first rotation sensor 9a and the second rotation sensor 9b, that each indicate the rotation position of the rotor are transmitted to the input circuit 12 of the control circuit unit 4.

The first MPU 10a and the second MPU 10b are connected with each other through a communication line 14 so that they can mutually and periodically transmit and receive data and information which are predetermined-format communication signals. By mutually transmitting and receiving data and information relating thereto through the communication line 14, the first MPU 10a can understand the condition of the second MPU 10b, and vice versa. For example, when the first MPU 10a detects an abnormality in the control system to which the first MPU 10a belongs and hence turns on a predetermined switching device in the control system to which the first MPU 10a belongs, this information can be transmitted to the second MPU 10b. When an abnormality occurs in any one of the MPUs itself, the periodic predetermined-format communication signal can neither be transmitted nor be received; thus, one of the MPUs can detect the fact that an abnormality has occurred in the other one of the MPUs.

As described above, the control unit 1 has double redundant systems; each of the systems independently performs information inputting and calculation, and outputs a control amount for driving the motor 2.

Figure 2A:
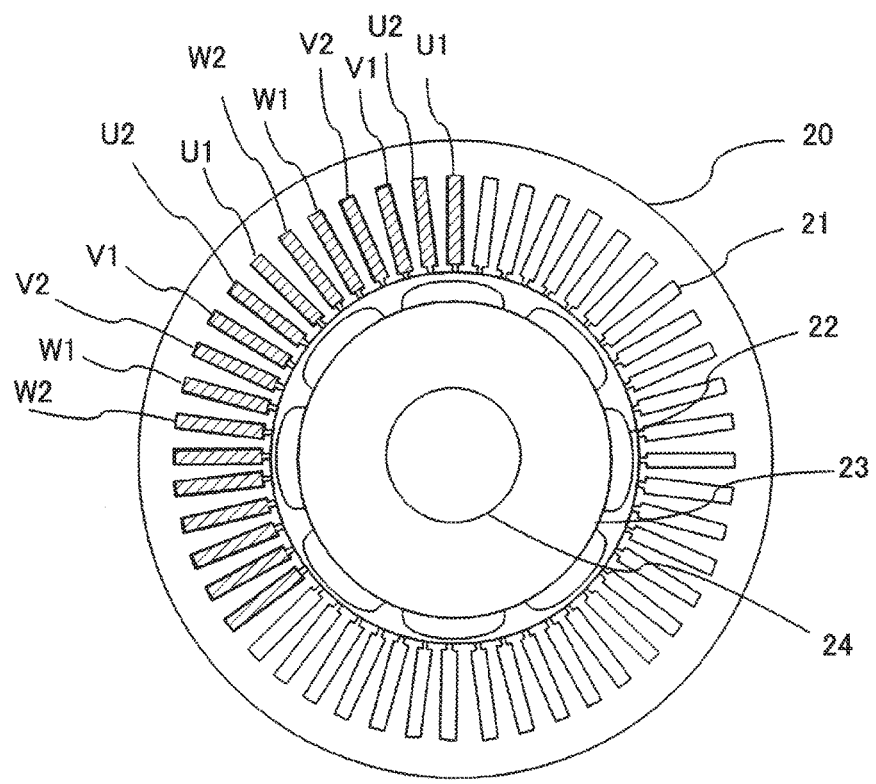
FIG. 2A is a transverse cross-sectional view of a motor in the driving apparatus according to Embodiment 1 of the present invention.
Figure 2B:
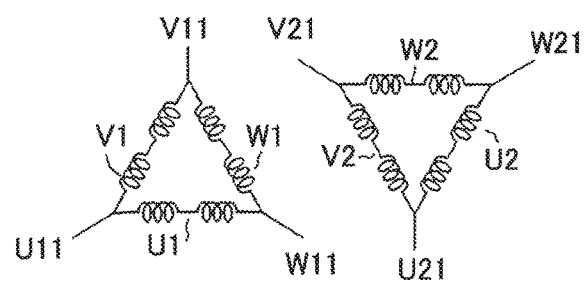
FIG. 2B is a set of circuit diagrams illustrating stator windings of the motor in the electric driving apparatus according to Embodiment 1 of the present invention.

Next, the structure of the motor 2 will be explained in detail. FIG. 2A is a transverse cross-sectional view of the motor in the electric driving apparatus according to Embodiment 1 of the present invention; FIG. 2B is a set of circuit diagrams illustrating the stator windings of the motor in the electric driving apparatus according to Embodiment 1 of the present invention. In FIG. 2A, a stator 20 in which forty-eight slots 21 are formed in the inner circumference portion thereof is configured with stacked thin-plate steel sheets. A rotor 23 is disposed in the inner space of the stator 20 in such a way as to be coaxial with the stator 20. Eight (eight poles) magnetic-field poles 22 formed of a permanent magnet are arranged at predetermined positions on the outer circumference portion of the rotor 23 in such a way that the N-pole and the S-pole are alternately arranged. An output axle 24 is fixed in the center portion of the rotor gear (unillustrated) is disposed in one of the axis-direction ends of the output axle 24 so that driver's steering of the handwheel can be assisted.

Two or more, for example, four coil conductors are inserted into each of the slots 21. The respective coil conductors of the U1-phase winding, the V1-phase winding, the W1-phase winding are connected with one another at the portion extending from the slot 21 to each of the both axis-direction ends of the stator 20 and the respective coil conductors of the U2-phase winding, the V2-phase winding, the W2-phase winding are connected with one another at the portion extending from the slot 21 to each of the axis-direction both ends of the stator 20, so that the three-phase delta-connected first stator winding 2a and the three-phase delta-connected second stator winding 2b, illustrated in FIG. 2B, are formed.

In the left-half portion of FIG. 2A, part of the arrangement, in the slots 21, of the respective coil conductors of the U1-phase winding, the V1-phase winding, the W1-phase winding, U2-phase winding, the V2-phase winding, and the W2-phase winding are illustrated. In this situation, making an explanation with the coil conductor of the U1-phase winding belonging to the first system, the coil conductor of the U1-phase winding that is inserted into a specific slot and then extends from the specific slot to the both axis-direction ends of the stator 20 is inserted again into the sixth slot from the specific slot. The coil conductors of the V1-phase winding, the W1-phase winding belonging to the first system and the coil conductors of the U2-phase winding, the V2-phase winding, and the W2-phase winding belonging to the second system are inserted into the respective slots 21 in the same manner as the coil conductor of the U1-phase winding.

Meanwhile, as illustrated in FIG. 2A, the coil conductors of the U1-phase winding and the U2-phase winding are inserted into the respective adjacent slots; the coil conductors of the V1-phase winding and the V2-phase winding are inserted into the respective adjacent slots; the coil conductors of the W1-phase winding and the W2-phase winding are inserted into the respective adjacent slots. That is to say, the coil conductor of the U2-phase winding belonging to the second system is inserted into the slot that is adjacent to the slot into which the coil conductor of the U1-phase winding is inserted; the coil conductor of the V1-phase winding belonging to the first system is inserted into the slot that is adjacent to the slot into which the coil conductor of the U2-phase winding is inserted; the coil conductor of the V2-phase winding belonging to the second system is inserted into the slot that is adjacent to the slot into which the coil conductor of the V1-phase winding is inserted; the coil conductor of the W1-phase winding belonging to the first system is inserted into the slot that is adjacent to the slot into which the coil conductor of the V2-phase winding is inserted; the coil conductor of the W2-phase winding belonging to the second system is inserted into the slot that is adjacent to the slot into which the coil conductor of the W1-phase winding is inserted.

As described above, the coil conductors of the windings of the respective phases belonging to the first system or the second system are regularly inserted into the slots 21 in the foregoing order and are wound around the stator 20. The coil conductors of the windings of the respective phases belonging to the first system or the second system are wound around the stator 20 in the manner of a distributed winding, as described above. Then, as illustrated in FIG. 2B, the terminal ends of the coil conductors of the respective phases are connected with one another in such a way that the first stator winding 2a and the second stator winding 2b that are delta-connected for the first system and the second system, respectively, are configured.

As illustrated in FIG. 2B, in the first stator winding 2a, a winding end portion U11 in which the connection portion between the coil conductor of the U1-phase winding and the coil conductor of the V1-phase winding is extended is connected with the U-phase motor relay switching device 34U of the first inverter circuit 3a in FIG. 1; similarly, a winding end portion V1 is connected with the motor relay switching device 34V and a winding end portion W1 is connected with the motor relay switching device 34W.

Similarly, in the second stator winding 2b, a winding end portion U2 in which the connection portion between the coil conductor of the U2-phase winding and the coil conductor of the V2-phase winding is extended is connected with the motor relay switching device 39U of the second inverter circuit 3b in FIG. 2; similarly, a winding end portion V2 is connected with the motor relay switching device 39V and a winding end portion W2 is connected with the motor relay switching device 39W.

In the motor illustrated in FIGS. 2A and 2B, the first stator winding 2a and the second stator winding 2b are configured in such a way that there exists a phase difference of 30° [electric angle] there between. In the case where in the double-system inverter formed of two inverter circuits including the first inverter circuit 3a and the second inverter circuit 3b, each of the inverter circuits is utilized with a modulation rate of 100% or higher, an electric angle 6th-order radial-direction output fluctuation occurs in the motor 2 for each of the systems; however, when the first inverter circuit 3a and the second inverter circuit 3b energize the first stator winding 2a and the second stator winding 2b, respectively, and the outputs of the first system and the second system are summed up through the motor 2, the electric angle 6th-order output fluctuations of the respective systems are canceled out in the motor, as a whole.

In other words, when the first inverter circuit 3a belonging to the first system and the second inverter circuit 3b belonging to the second system are appropriately controlled, the torque ripple becomes smaller and motor driving with small harmonics in the electromagnetic noise can be performed.

Provided that the control circuit unit 4 includes only a single MPU and a single CPU provided in the MPU, the control amount calculated by the single MPU is outputted to the inverter circuit of one of the two systems without changing the phase of the control amount, and a control amount is calculated by adding 30° to the foregoing calculated control amount and outputted to the inverter circuit of the other one of the two systems; as a result, the electric angle 6th-order output fluctuations of the respective systems can be canceled out in the motor, as a whole.

Meanwhile, in the case of such a configuration as that of the electric driving apparatus, according to Embodiment 1 of the present invention, in which the redundancy of the control system is considered and hence the control circuit unit 4 has two independent MPUs, i.e., the first MPU 10a and the second MPU 10b and in which each of the MPUs has a single independent CPU, it as necessary that there exists phase difference between the output of the first MPU 10a and the output of the second MPU 10b. In order to reduce a ripple causes by the phase difference between the respective outputs of the two MPUs, it is required to synchronize the respective outputs of the two MPUs; this matter will be described later.

In the following explanation, there will be described an electric driving apparatus having a motor in which there exists a phase difference of 30° between the first system and the second system so that the electric angle 6th-order output fluctuations can be canceled out; for example, when m systems are provided and, in order to cancel out the electric angle nth-order output fluctuations, a phase difference of $[360/m/n]°$ is provided between the m respective systems, the same effect is obtained.

Because the first stator winding 2a belonging to the first system and the second stator winding 2b belonging to the second system are electrically coupled, the current control in one of the systems considerably provides an effect to the current control in the other one of the systems and hence an interference problem between the two systems occurs. Therefore, when the first MPU 10a and the second MPU 10b are independently controlled, problems such as an increase in the torque ripple of the motor 2, an increase in noise, and an increase in the motor rotation speed may be posed. Accordingly, in the case where the electric coupling between the two systems is large, it is required to perform such non-interference control as disclosed in Patent Document 3; this matter also will be described later. In this explanation, there has been described the case where the stator winding is made through a distributed winding method; however, even when the stator winding is made through a method other than a distributed winding method, the same effect is obtained, as long as the respective stator windings are electrically coupled with each other.

Next, there will be explained the details of the control performed in the electric driving apparatus, according to Embodiment 1 of the present invention, that is configured as described above. Most of the control performed in the electric driving apparatus according to Embodiment 1 of the present invention is processed in accordance with respective programs for the first CPU included in the first MPU 10a and the second CPU included in the second MPU 10b.

Figure 3A:
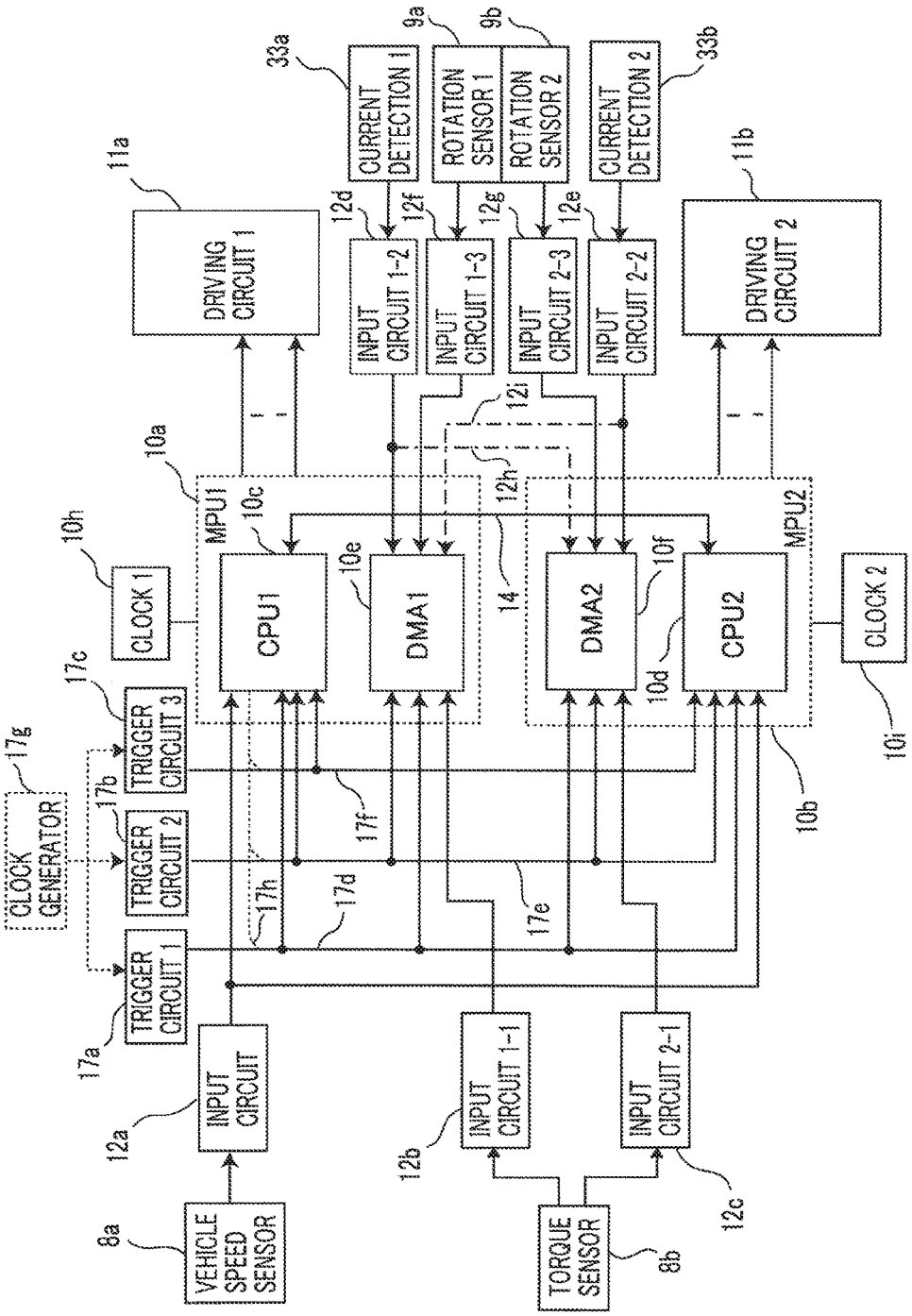
FIG. 3A is a configuration diagram representing a control circuit unit including MPUs in the electric driving apparatus according to Embodiment 1 of the present invention.

FIG. 3A is a configuration diagram representing a control circuit unit including MPUs in the electric driving apparatus according to Embodiment 1 of the present invention. In FIG. 3A, the first MPU 10a includes a first CPU 10c, which is a first calculation means, and a first direct memory access (referred to as a DMA, hereinafter) 10e, which is a memory means that operates independently from the processing in the first CPU 10c. The first CPU 10c performs processing of all the programs, based on a clock signal from a first clock 10h.

The second MPU 10b includes a second CPU 10d, which is a second calculation means, and a second DMA 10f, which is a memory means that operates independently from the processing in the second CPU 10d. The second CPU 10d performs processing of all the programs, based on a clock signal from a second clock 10i. The first clock 10h and the second clock 10i generate respective clock signals, having a single and the same period, that are the references for the processing steps.

Vehicle speed information from a vehicle speed sensor 8a is directly inputted to the first MPU 10a and the second MPU 10b by way of a first input circuit 12a. In contrast, a torque signal from a torque sensor 8b is independently inputted to the first DMA 10e and the second DMA 10f by way of two independent input circuits, i.e., second and third input circuits 12b and 12c, respectively.

A first current sensor 33a detects electric currents of the respective phases, based on the respective voltages across the shunt resistors 33U, 33V, and 33W provided for the respective phases of the first inverter circuit 3a in FIG. 1; first current detection information obtained through the detection is inputted to the first DMA 10e and the second DMA 10f by way of a fourth input circuit 12d. A second current sensor 33b detects electric currents of the respective phases, based on the respective voltages across the shunt resistors 38U, 38V, and 38W provided for the respective phases of the second inverter circuit 3b in FIG. 1; second current detection information obtained through the detection is inputted to the first DMA 10e and the second DMA 10f by way of a fifth input circuit 12e.

Moreover, first rotation position information from the first rotation sensor 9a is inputted to the first DMA 10e by way of a sixth input circuit 12f. Second rotation position information from the second rotation sensor 9b is inputted to the second DMA 10f by way of a seventh input circuit 12g.

Respective trigger signals outputted from a first trigger circuit 17a, a second trigger circuit 17b, and a third trigger circuit 17c are inputted to the first CPU 10c, the second CPU 10d, the first DMA 10e, and the second DMA 10f, through lines 17d, 17e, and 17f. The period of the trigger signal outputted from the third trigger circuit 17c is set to be the shortest; the period of the trigger signal outputted from the second trigger circuit 17b is set to be the second shortest; the period of the trigger signal outputted from the first trigger circuit 17a is set to be the longest. Information pieces inputted from corresponding sensors to the first DMA and the second DMA 10f are especially important in terms of control; thus, these information pieces will be referred to as specific information pieces. These specific information pieces are divided into two groups and are stored in memories in accordance with the trigger signal outputted from the first trigger circuit 17a or the second trigger circuit 17b.

In the control circuit unit 4 represented in FIG. 3A, the information pieces to be stored based on the trigger signal from the second trigger circuit 17b, among the three trigger circuits, that outputs a trigger signal having the second shortest period are the first current detection information, the second current detection information, the first rotation position information, and the second rotation position information. The information to be stored based on the trigger signal from the first trigger circuit 17a, among the three trigger circuits, that outputs the trigger signal having the longest period is torque information.

The connection may be made in such a way that the respective input information pieces are stored based on the trigger signal from the second trigger circuit 17b that outputs a trigger signal having the second shortest period or the trigger signal from the third trigger circuit 17c that outputs a trigger signal having the shortest period.

The respective information pieces are concurrently stored in accordance with the trigger signals; thus, a single and the same information value can be stored in the first DMA 10e and the second DMA 10f. For each of the trigger signals, the first CPU 10c and the second CPU 10d receive various kinds of information pieces stored in the first DMA 10e and the second DMA 10f. Because separately from the processing in the first CPU 10c and the second CPU 10d, various kinds of information pieces are independently stored in the first DMA 10e and the second DMA 10f, the various kinds of information pieces can concurrently be stored without interfering with the program processing in the first CPU 10c and the second CPU 10d.

As a result, because when the first CPU 10c and the second CPU 10d utilize input information, a single and the same value can be utilized, it is prevented that both the CPUs utilize respective information pieces having different timings. After that, control commands calculated in accordance with after-mentioned programs in the first CPU 10c and the second CPU 10d are outputted to the first driving circuit 11a and the second driving circuit 11b. As described above, the trigger signals having different periods make it possible to concurrently input the various kinds of specific information pieces; various variations are conceivable for the kindof the trigger signal and the specific information pieces.

Meanwhile, the respective trigger signals outputted from the first trigger circuit 17a, the second trigger circuit 17b, and the third trigger circuit 17c are inputted also to the first CPU 10c and the second CPU 10d; the first CPU 10c and the second CPU 10d each perform predetermined processing in accordance with these trigger signals. This processing makes it possible that the first CPU 10c and the second CPU 10d concurrently perform a single and the same processing; thus, the CPU processing steps can be synchronized with each other.

In particular, the contents of the concurrent processing based on the earliest trigger signal from the third trigger circuit 17c correspond to the output of a PWM command signal for practically controlling the first driving circuit 11a and the second driving circuit 11b. In other words, because the period of the trigger signal from the third trigger circuit 17c indicates the carrier period of the PWM signal, the first CPU 10c and the second CPU 10d can concurrently perform outputting in synchronization with the trigger signal from the third trigger circuit 17c, in response to the output of the PWM command signal. That is to say, there can be prevented the problem that when the method disclosed in Patent Document 2 is utilized without synchronization, the effect of a switching pulse caused in the PWM signal of another group enlarges a current detection error. The fact that concurrent outputting can be performed suggests that for one of the CPUs, the other one of the CPUs can readily shift the timing of its output by a predetermined time or a predetermined phase.

In Embodiment 1 represented in FIG. 3A, the generation of the foregoing three kinds of trigger signals having different periods, i.e., the respective trigger signals from the first trigger circuit 17a, the second trigger circuit 17b, and the third trigger circuit 17c, is performed in the following manner:

a clock generator 17g is disposed and a clock from the clock generator 17g is inputted to the first trigger circuit 17a, the second trigger circuit 17b, and the third trigger circuit 17c that each have a predetermined frequency divider; the trigger signals are generated by dividing the clock from the clock generator 17g by means of the respective frequency dividers.

The clock generator 17g can be replaced by any one of the first clock 10h and the second clock 10i. A period signal can directly be outputted through one of the output ports of any one of the first CPU 10c and the second CPU 10d (this case is indicated by a broken line 17h in FIG. 3A). Here, the first CPU 10c is set to be a parent CPU, and the second CPU 10d is set to be a child CPU, which is subordinate to the parent CPU. In the case where when the first CPU 10c and the second CPU 10d have such a parent-child relationship, pull-up and pull-down hardware is configured in such a way that a single input port is utilized and that the input level of the first CPU 10c, which is the parent CPU, is made High and the input level of the second CPU 10d, which the child CPU, is made Low, the parent-child relationship between the CPUs having a single and the same program can automatically be established. Trigger outputting by the output of the CPU itself results in a merit that the first trigger circuit 17a, the second trigger circuit 17b, the third trigger circuit 17c, and the clock generator 17g can be omitted.

Next, based on flowcharts, there will be explained the processing by the CPU included in the MPU of the control circuit unit 4 configured in such a manner as described above. FIG. 4 is a main flowchart representing the operation of the CPU in the electric driving apparatus according to Embodiment 1 of the present invention. Because the first CPU 10c performs almost the same processing as the second CPU 10d performs, the processing of the first CPU 10c, as an example, will be explained.

At first, when the ignition switch 7 illustrated in FIG. 1 is turned on, a power source is supplied also to the first CPU 10c by way of the power-supply circuit 13 of the control circuit unit 4. In FIG. 4, in the step S1, the RAMs, the ROMs, the ports, and the like are initialized.

Next, in the step S2, all the information pieces inputted from the respective sensors by way of the first input circuit 12a through the seventh input circuit 12g are obtained. The information pieces include not only the specific information obtained through the first DMA but communication data of the second CPU 10d, which is a partner, and ordinary information such as a vehicle speed.

In the step S3, processing of detecting an abnormality is performed. Specifically, there exist two methods, i.e., a method in which the switching devices in the first inverter circuit 3a are driven and the flowing electric currents are detected by use of the shunt resistors 33U, 33V, and 33W so that an abnormality is detected and a method in which the winding terminal voltage of the motor 2 is monitored so that it is checked whether or not respective predetermined voltages appear in accordance with the drive of the switching devices. Moreover, in the case where the difference between the detection current value and the target current value is not minimized even after a predetermined time elapses, it may be determined that an abnormality has occurred, because electric leakage may have occurred. As described above, because the respective voltages and currents are monitored so that an abnormality is detected, the abnormality, even in a single phase, can be detected. Then, whether or not an abnormality exists and the state of the abnormality are stored.

Next, in the step S4, whether or not the detection of an abnormality has occurred is checked. In the case where no abnormality has occurred (N), a normal control amount is calculated in the step S5. In contrast, in the case where an abnormality has occurred (Y), abnormality processing is performed in the step S6 in accordance with the abnormality. For example, in the case of an open-failure in the upper-arm or lower-arm switching device of the first inverter circuit 3a, control-amount calculation is performed in such a way that at least any one of the motor relay switching devices 34U through 34W is turned of or that driving is performed by the switching devices of two normal phases. The abnormality processing includes processing in which in the case of a short-circuit failure, at least any one of the motor relay switching devices 34U through 34W is turned off and processing in which in the case of a double failure, a short-to-power failure of the motor winding, a short-to-ground failure thereof, or the like, all the switching devices including the first power-source relay 5a and the second power-source relay 5b are turned off.

In contrast, in the case where in the step S4, it is determined that no abnormality has occurred (N), a normal-time control amount is calculated in the step S5. The method therefore is the same as that in a conventional apparatus; based on the torque sensor and a vehicle speed, a target current value is calculated; a current detection value is compared with the target current value; then, based on the difference therebetween, a control command value is calculated. After that, the step S5 is followed by the step S7, where the first CPU 10c outputs communication information in order to provide information to and receive information from the partner CPU, i.e., the second CPU 10d, here. It is made possible to utilize this communication information in order to transmit not only the state of an abnormality but, for example, input information and specific information, to receive the same information from the partner CPU, and to ascertain that no difference therebetween.

Next, in the case where respective processing steps are implemented every predetermined time, for example, every 5 [ms], the processing is on standby in the step S8 until 5 [ms] elapses. When the predetermined time elapses (Y), the step S8 is followed by the step S2, where the processing is performed in the same procedure. What has been described heretofore is the main flow.

Figure 5A:
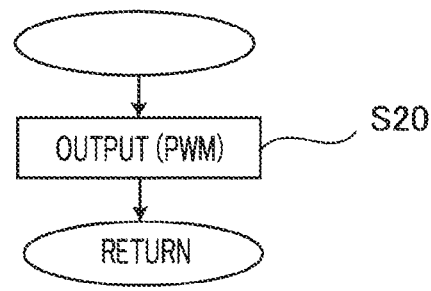
FIG. 5A is a sub-flowchart representing the operation of a CPU in the electric driving apparatus according to Embodiment 1 of the present invention.
Figure 5B:
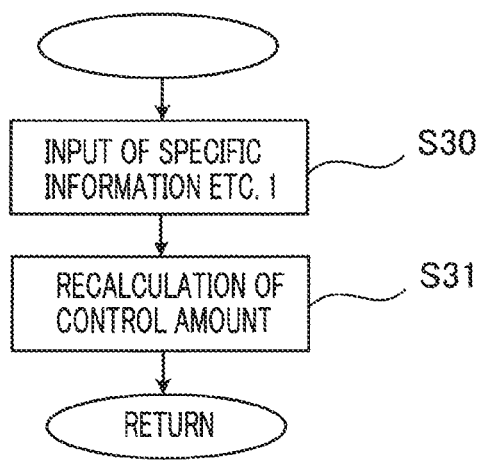
FIG. 5B is a sub-flowchart representing the operation of a CPU in the electric driving apparatus according to Embodiment 1 of the present invention.
Figure 5C:
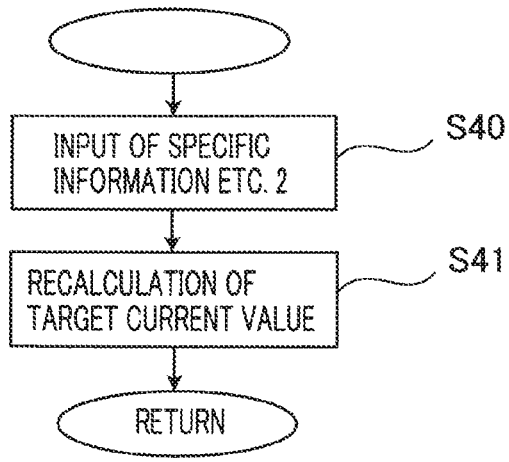
FIG. 5C is a sub-flowchart representing the operation of a CPU in the electric driving apparatus according to Embodiment 1 of the present invention.

Next, the explanation will be made based on a sub-flowchart. FIGS. 5A, 5B, and 5C are sub-flowcharts representing the operation of the CPU in the electric driving apparatus according to Embodiment 1 of the present invention. The sub-flow in each of FIGS. 5A, 5B, and 5C operates in a period that is shorter than that of the main flow in FIG. 4; after processing is performed in the sub-flow every predetermined period, the main flow is resumed again; in other words, the same operation as interrupt processing is performed.

The processing in FIG. 5A is implemented based on the trigger signal from the third trigger circuit 17c in FIG. 3A, i.e., implemented in the shortest period. For example, the processing is implemented every 50 [μs]. In the step S20, in accordance with the duty value of the PWM command signal, which is a control amount that has already been stored, the PWM command signal is outputted. The first CPU 10c and the second CPU 10d can output respective command signals that are synchronized with each other by the trigger signal from the third trigger circuit 17c. Because this is outputting processing in accordance with the shortest period, it is not advisable that processing that requires another time is inserted therein to; thus, only the outputting processing is implemented, here.

The processing in FIG. 5B is implemented in accordance with the trigger signal from the second trigger circuit 17b. This period is, for example, 200 [μs], i.e., integer-fold as large as the carrier period of the PWM. Here, in the step S30, specific information pieces are obtained from the first DMA 10e. Among the specific information pieces, at least two kinds of information pieces, i.e., the value of the first current detection information and the value of the first rotation position information are required. In addition to the specific information pieces, the target current value calculated in the main flow and the like is required and hence is obtained.

In the step S31, based on these information pieces, a control amount is calculated again; the control amount is converted into a PWM amount and then is stored. As is the case with a conventional apparatus, this calculation method is implemented in such a way that a voltage command value as calculated an a biaxial (d-axis, and q-axis) coordinate system, for example, based on the difference between the target voltage value and the detection current value; then, the voltage command value in the biaxial coordinate system is converted into respective values of U, V, and W phases, based on a rotation sensor information value. In this regard, however, because the first system and the second system are electrically coupled with each other, not only the detection current value of one of the systems but the detection current value of the other one of the systems is considered (12h and 12i in FIG. 3); for example, the voltage command value is calculated in such a manner as the method disclosed in Patent Document 3.

As a result, the control amount for the PWA command signal in FIG. 5A can be stored. The difference between the control amount calculation in the step S31 and the control amount calculation 1 in the step S5 of the main flow in FIG. 4 is not only that in the re-calculation of the control amount in the step S31 of FIG. 5B, the specific information is the latest but also that the control amounts related to information pieces, such as the vehicle speed and the like, that change, for example, only in the main flow are not calculated but a stored result is utilized so that the calculation processing time is shortened.

The processing in FIG. 5C is implemented in accordance with the period of the trigger signal from the first trigger circuit 17a, i.e., implemented in the longest period. For example, the processing is implemented in accordance with the trigger signal having a period of 1 [ms], i.e., implemented in accordance with the trigger signal having a period that is integer-fold as large as the period of the trigger signal from the second trigger circuit 17b. In the step S40, specific information is obtained. In this case, the specific information is torque information, with which the demanded torque can be known. In the step S41, the target current value is calculated. This calculation method is the same as that in a conventional apparatus; the target current value for performing assistance is calculated and stored by utilizing the specific information, the vehicle speed, the rotation speed information from the rotation sensor, and the like.

The trigger processing steps in FIGS. 5A, 5B, and 5C make it possible to calculate the target current value in a period of 1 [ms], to calculate the control amount every 200 [μs], and to output the control amount every 50 [μs]. These trigger signals make it possible to secure synchronization between the first MPU 10a and the second MPU 10b. That is to say, because the synchronization between the two MPUs can be secured in a period that is shorter than the period of 5 [ms] in the main flow represented in FIG. 4, it is not necessarily required to secure synchronization in the main flow. Because the synchronization can be secured with the output having the shortest period, it is easy to secure a phase difference between the respective outputs of the two MPUs; thus, as is the case where phase differences are provided between the respective phases, it is made possible to provide desired phase differences even in the case of driving of the other system.

That is to say, by synchronizing the PWM outputs, the current detection error due to switching noise can be eliminated; by synchronizing the voltage command values, the control for making the electric couple noninterfering can normally be performed; by making the calculation period for the target current value longer than the processing period for the current control, stable torque control can be performed.

In the case where due to treatment such as insulation, the electric coupling between the first stator winding and the second stator winding is small, the noninterfering control is not performed; in that case, the lines indicated by the reference characters 12h and 12i in FIG. 3A may not be connected.

As described above, the electric driving apparatus according to Embodiment 1 of the present invention makes it possible that based on the trigger signals from the trigger circuit, synchronization between the respective output timings of PWMs, which are outputs thereof, of the two MPUs and that the two MPUs can concurrently secure a single and the same value of the specific information. Accordingly, even in the case where with regard to motor windings illustrated in FIGS. 2A and 2B, interference lies between the first stator winding and the second stator winding, the respective demanded torque values of the two systems are equal to each other; based on this fact, the respective target voltage values are equal to each other and the respective voltage command values are equal to each other; moreover, a voltage command value can be obtained based on a phase difference; furthermore, the respective PWM outputs can prevent the control noise signals caused by the switching devices of the two systems from deteriorating the current-detection accuracy.

In the above explanation, two pieces each of MPU and CPU are described; however, even three MPUs can be utilized, when the program processing is still implemented based on a plurality of trigger signals.

Figure 3B:
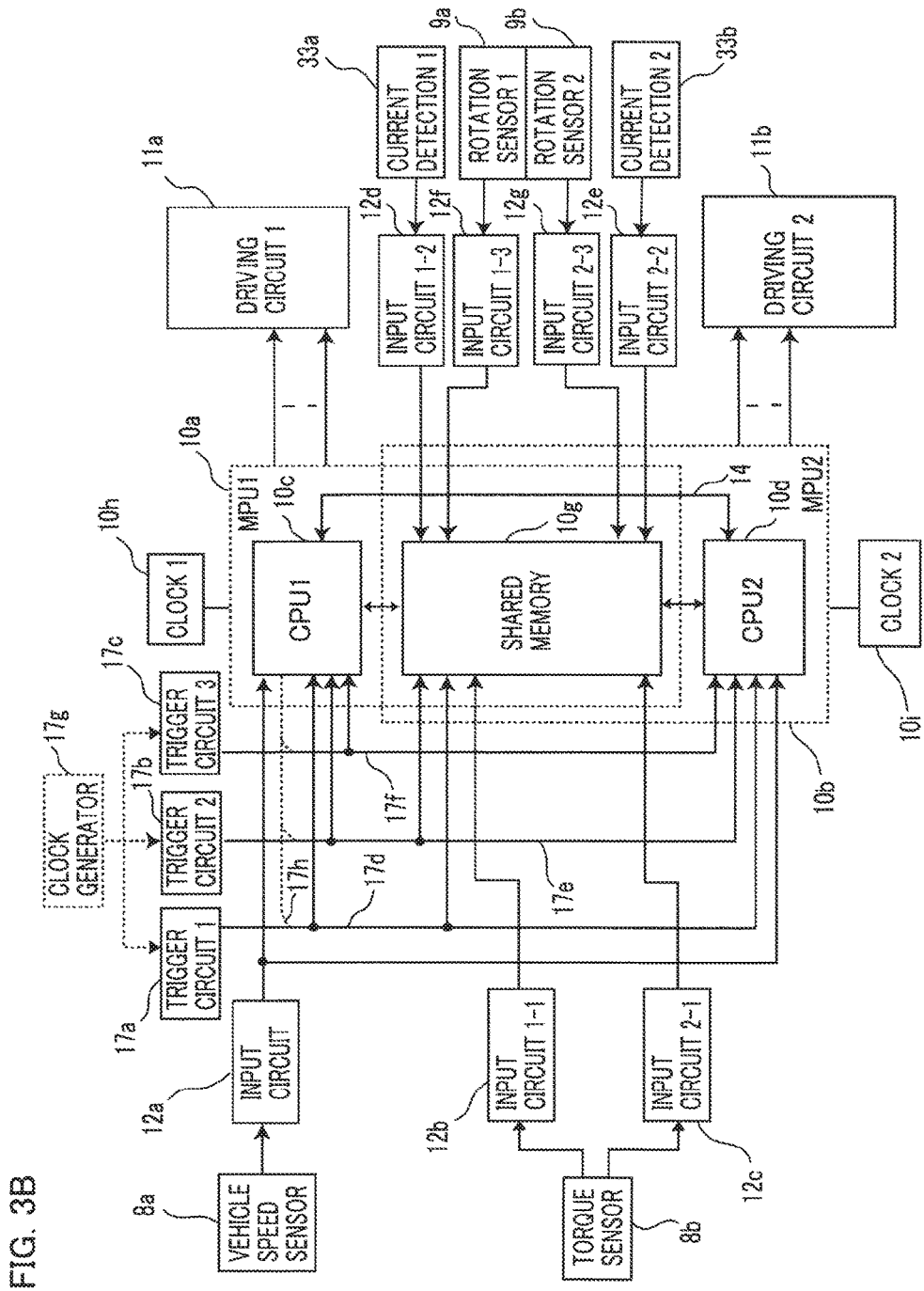
FIG. 3B is a configuration diagram representing an variant example of the control circuit unit including MPUs in the electric driving apparatus according to Embodiment 1 of the present invention.

FIG. 3B is a configuration diagram representing an variant example of the control circuit unit including MPUs in the electric driving apparatus according to Embodiment 1 of the present invention. The configuration of the variant example represented in FIG. 3B differs from the configuration represented in FIG. 3A in that a different memory means is included in the first MPU 10a and the second MPU 10b.

In FIG. 3B, the first MPU 10a includes a shared memory 10g that can be accessed by the first CPU 10c and the second CPU 10d. The second MPU 10b includes the shared memory 10g that can be accessed by the first CPU 10c and the second CPU 10d. It may be considered that in this configuration, the first DMA 10e and the second DMA 10f are replaced by the shared memory 10g; thus, it goes without saying that an effect the same as that of the configuration in FIG. 3A can be obtained.

Moreover, in comparison with the configuration in FIG. 3A, there can be obtained an effect that by use of the shared memory 10g, it is made possible that without utilizing the first trigger circuit 17a and the second trigger circuit 17b, respective signals, from the input circuits, that are utilized in the first CPU 10c and the second CPU 10d are synchronized with each other. In other words, it is not necessary that the first MPU 10a and the second MPU 10b are components independent from each other; it may be allowed that a single and the same package includes two independent CPUs, i.e., the first CPU 10c and the second CPU 10d. In the case of a multicore configuration, it may be allowed that when specific information is inputted from one of the CPUs to the other one of the CPUs and vice versa, the specific information is obtained not by use of the first DMA 10*e* and the second DMA 10*f* but through a memory that can commonly be accessed.

Embodiment 2

Figure 6A:
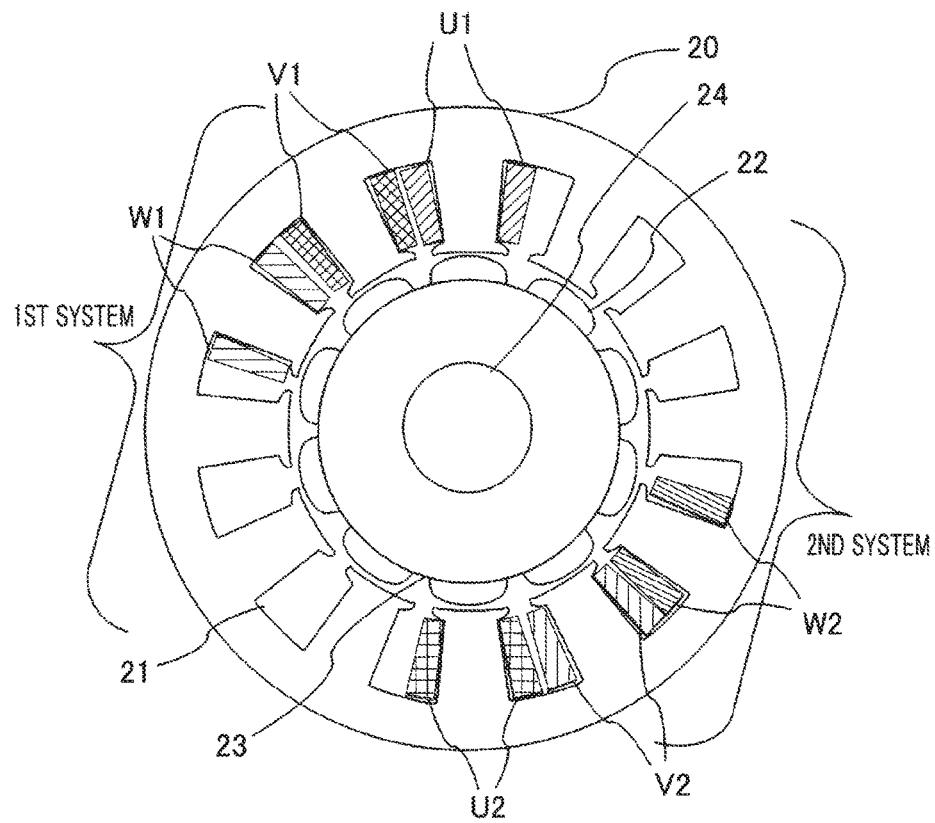
FIG. 6A is a transverse cross-sectional view of a motor in the electric driving apparatus according to Embodiment 2 of the present invention.
Figure 6B:
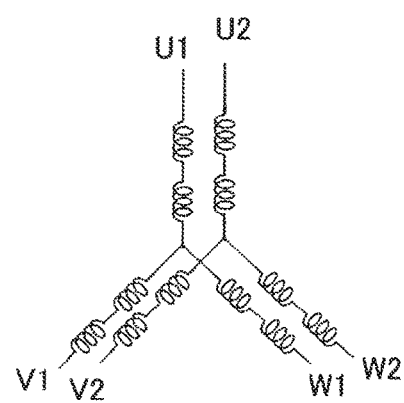
FIG. 6B an explanatory view illustrating stator windings of the motor in the electric driving apparatus according to Embodiment 2 of the present invention.

Next, Embodiment 2 will be explained FIG. 6A is a transverse cross-sectional view of a motor in an electric driving apparatus according to Embodiment 2 of the present invention; FIG. 6B is a circuit diagram representing the stator windings of the motor in the electric driving apparatus according to Embodiment 2 of the present invention. The circuit diagram, in FIG. 1, of Embodiment 1 is applied to Embodiment 2. Hereinafter, the same reference characters denote the same or similar portions. FIG. 6A is a drawing corresponding to FIG. 2A for Embodiment 1. In the following explanation, the difference from Embodiment 1 will mainly be explained.

In FIG. 6A, a stator 20 in which twelve slots 21 are arranged in the inner circumference portion thereof is configured with stacked thin-plate steel sheets. A rotor 23 is disposed in the center of the stator 20 in such a way as to be coaxial with the stator 20; ten magnetic-field poles 22 formed of a permanent magnet are arranged on the outer circumference portion of the rotor 23 in such a way that the N-pole and the S-pole are alternately arranged. An output axle 24 is extended in the center of the rotor 23; a gear is disposed in one of the axis-direction ends of the output axle 24 so that steering of the handwheel is assisted.

A great number of coils are arranged in the slots 21; the coil extending from the slot 21 is wound. Pat of the winding state of the coil is illustrated in FIG. 6B. As is the case with Embodiment 1, two groups of three-phase windings are formed; however, the winding of the first, system and the winding of the second system are arranged in the respective slots that are apart from each other. As far as the U1-phase coil is concerned, there is illustrated coils inserted into the respective slots that are adjacent to each other and flank one tooth. The U1-phase coil is wound in a concentrated manner around one of the adjacent teeth; in the vicinity of this tooth, the V1-phase coil and the W1-phase coil are wound in that order.

FIG. 6B represents a circuit diagram of the coil windings. The coil windings are wound in a concentrated manner; the respective terminal ends are connected with one another in such a way as to form a star connection; the respective ends of the extended portions are connected with the corresponding motor relay switching devices of the inverter circuit in FIG. 1. Accordingly, each system has three terminal ends, and the respective terminal ends are independently connected with the inverter circuit.

Figure 7:
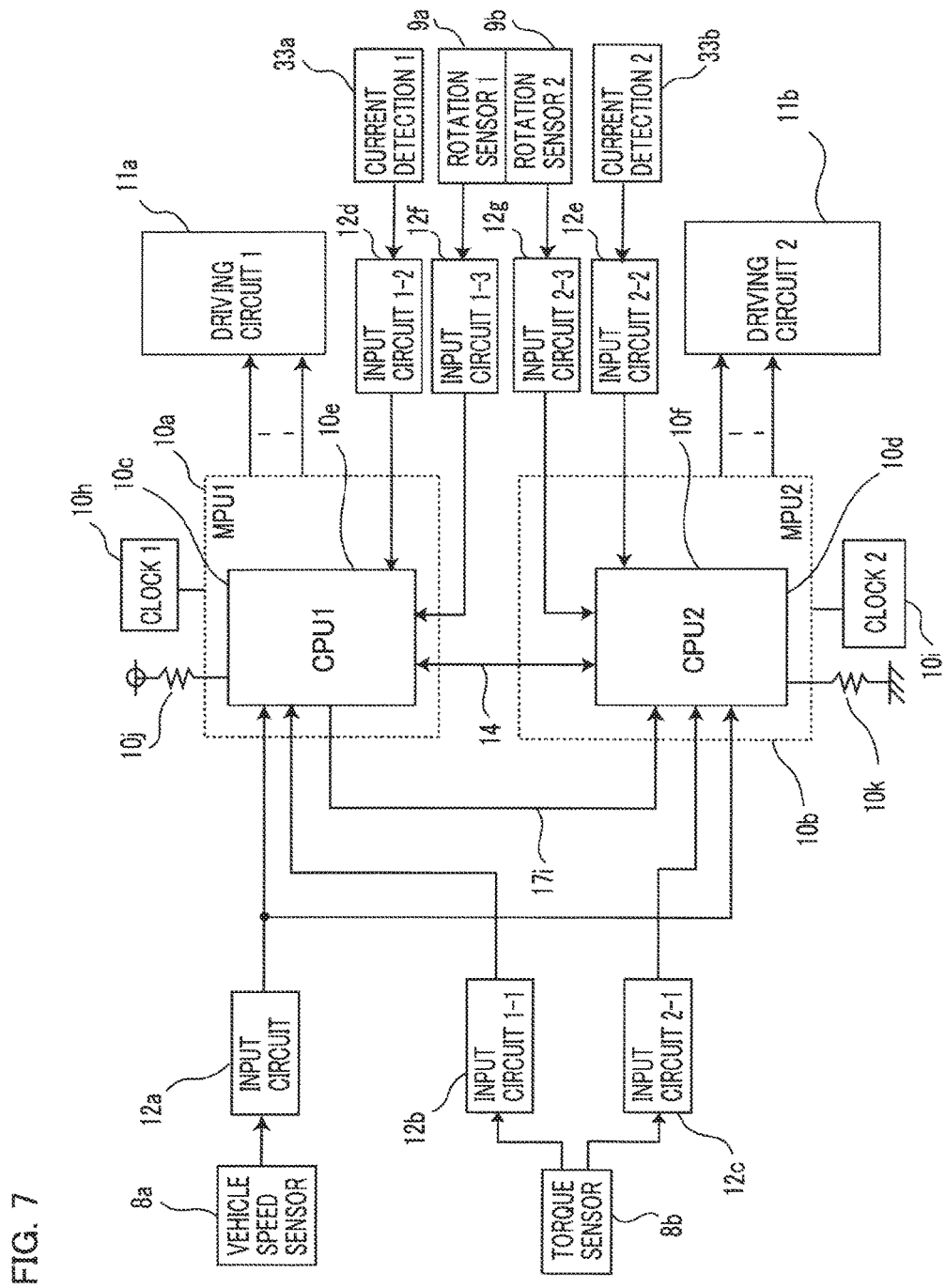
FIG. 7 is a configuration diagram representing a control circuit unit including MPUs in the electric driving apparatus according to Embodiment 2 of the present invention.

Next, the configuration of the MPU will be explained. FIG. 7 is a configuration diagram representing a control circuit unit including MPUs in the electric driving apparatus according to Embodiment 2 of the present invention. FIG. 7 corresponds to FIG. 3 for Embodiment 1. The trigger circuits in Embodiment 1 are removed, and a trigger signal 17*i* is outputted from the first CPU 10*c*. As a result, by utilizing a pull-up resistor 10*j* and a pull-down resistor 10*k*, it can automatically be determined that the first CPU 10*c* and the second CPU 10*d* are a parent CPU that outputs the trigger signal and a child CPU that receives the trigger signal, respectively. Moreover, the first and second DMAs in Embodiment 1 are also removed; each of the input information pieces is directly inputted to the first and second CPUs.

Figure 8:
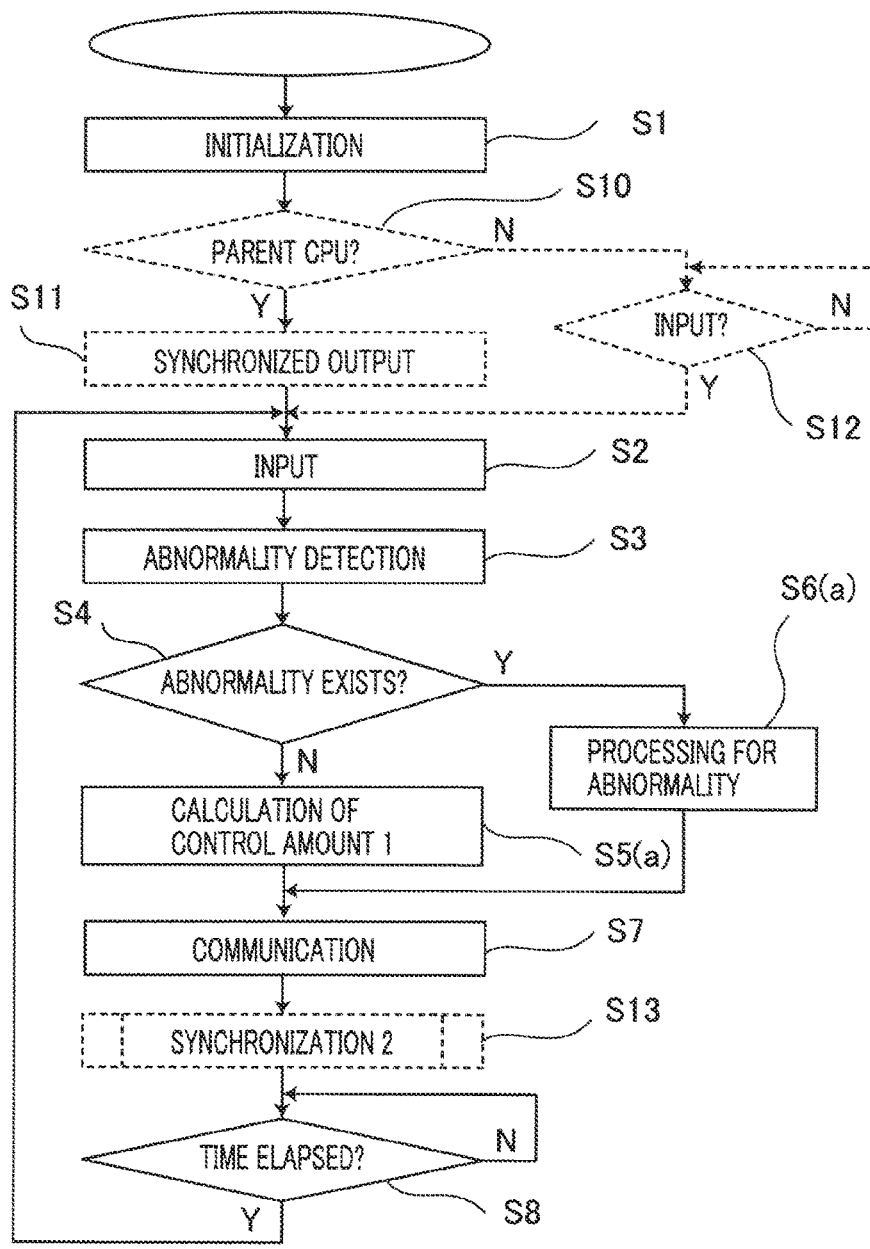
FIG. 8 is a main flowchart representing the operation of a CPU in the electric driving apparatus according to Embodiment 2 of the present invention.
Figure 9A:
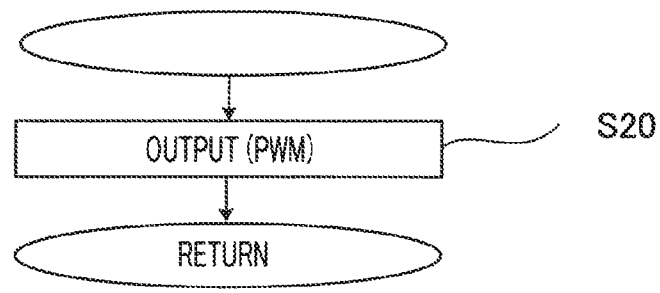
FIG. 9A is a sub-flowchart representing the operation of a CPU in the electric driving apparatus according to Embodiment 2 of the present invention.
Figure 9B:
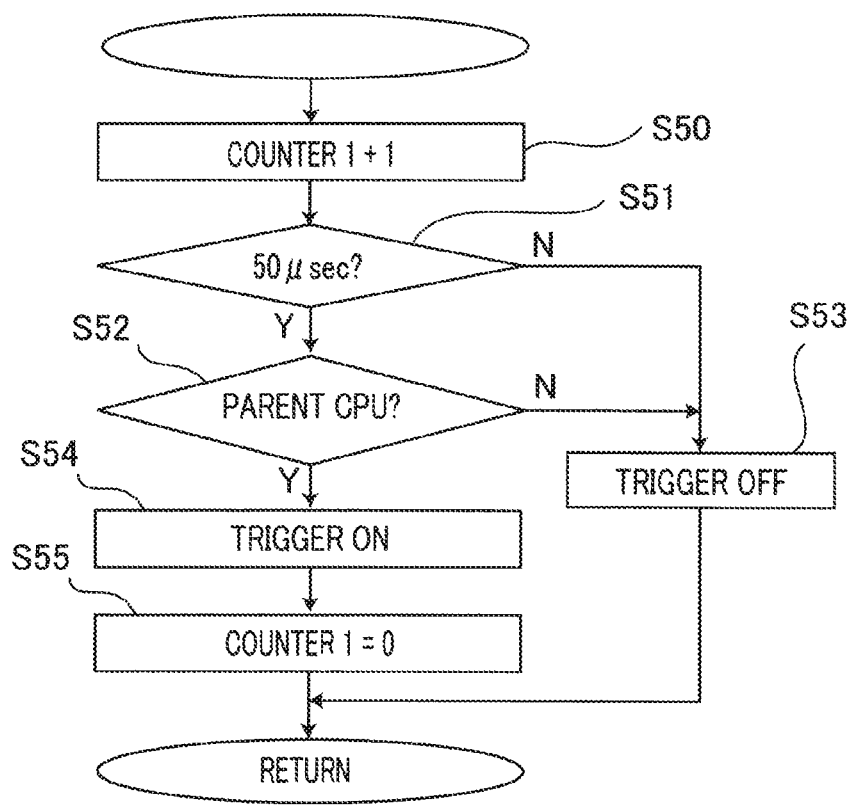
FIG. 9B is a sub-flowchart representing the operation of a CPU in the electric driving apparatus according to Embodiment 2 of the present invention.
Figure 10:
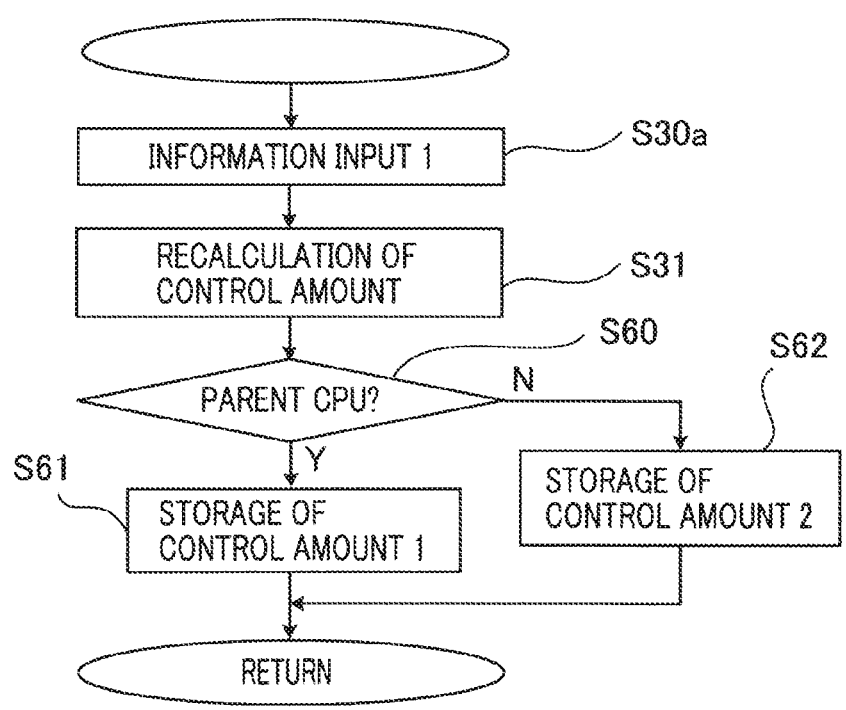
FIG. 10 is a sub-flowchart representing the operation of a CPU in the electric driving apparatus according to Embodiment 2 of the present invention.

With reference to a flowchart, there will be explained the synchronization and the operation of the first and second CPUs in hardware that is configured as represented in FIG. 7 by use of a motor 2 configured as illustrated in FIGS. 6A and 6B. FIG. 8 is a main flowchart representing the operation of the CPU in the electric driving apparatus according to Embodiment 2 of the present invention; FIG. 9A is a sub-flowchart representing the operation of the CPU in the electric driving apparatus according to Embodiment 2 of the present invention; FIG. 9B is a sub-flowchart representing the operation of the CPU in the electric driving apparatus according to Embodiment 2 of the present invention; FIG. 10 is a sub-flowchart representing the operation of the CPU in the electric driving apparatus according to Embodiment 2 of the present invention.

Because the first CPU 10*c* and the second CPU 10*d* have almost the same programs, the frst CPU 10*c* will be explained, here. Because the steps having reference characters the same as those in FIGS. 4 and 5 of Embodiment 1 perform the same or similar processing items, the explanation therefore will be omitted, and the steps that are different from those in Embodiment 1 will mainly be explained. In FIG. 8, the power is turned on; the step S1 for initialization is implemented; then, processing in a synchronization routine from the step S10 to the step S12 is implemented. This processing is not necessarily required; because it is more convenient to insert this processing into the main flow, it is indicated by broken lines.

In the step S10, it is checked whether the CPU is the parent CPU that outputs a trigger signal or the child CPU that receives the trigger signal. In the case where the CPU is the parent CPU (Y), the trigger signal is outputted in the step S11, and then the step S11 is followed by the step S2; however, it may be allowed that some waiting time, for example, a step in which a time for the partner CPU, i.e., the second CPU 10*d* to receive the trigger signal is waited is inserted between the step S11 and the step S2. In contrast, in the case where it is determined that the CPU is the child CPU (N), the step S12 in which a time for the child CPU to receive a signal from the partner CPU is waited is implemented. After that, the step S12 is followed by the step S2. As described above, the respective processing items of the first and second CPUs 10*c* and 10*d* are different from each other, depending on whether the first and second CPUs 10*c* and 10*d* are the parent CPU and the child CPU, respectively, and vice versa; however, the first and second CPUs 10*c* and 10*d* can synchronously perform the following processing.

Next, input information is obtained in the step S2; then, detection whether or not an abnormality exists is performed in the step S3. Subsequently, whether or not an abnormality exists is checked in the step S4; a normal-time control amount is calculated in the step S5(*a*); then, processing for an abnormal time is performed in the step S6(*a*) however, due to the difference in the motor stator windings in Embodiment 1, the calculation method may differ.

In the step S5(*a*), a target current is set, and the feedback amount based on the difference between the target current and a detection current value is calculated and stored. Also in the step S6(*a*) two-phase driving is continued or processing such as stopping driving in all phases is performed and stored. In the step S7, there is performed communication for one of the CPUs to notify the partner CPU of the state of its own. In the step S13, processing in the synchronization routine is implemented again. Because this processing is the same as the processing items in the steps S10 through S12 and is not necessarily required, it is represented by broken lines. In the step S8, waiting processing is implemented until a predetermined time elapses.

As described above, single-time synchronization processing is implemented each time the power source is turned on.

This method is obtained by integrating single-time synchronization processing with the normal processing routine. In particular, with regard to the time required for a so-called power-on reset, when the power source is turned on, a time difference between the respective processing starting timings of the two CPUs occurs due to hardware variations; therefore, the first synchronization is implemented when the power source is turned on. After that, the respective CPUs are synchronized with each other in each main flow (for example, every 5 [ms]); however, the synchronization needs not to be implemented in each main flow and may be implemented only once in a plurality of main flows. This synchronization results in the situation that the two CPUs each utilize almost the same values, as the input information and the output information; for example, by, as the communication processing, communicating the respective input information pieces or the output information pieces as the calculation results to the partner CPUs, the two CPUs can compare the information pieces and detect abnormalities.

As a synchronization signal, the communication signal in the step S7 can be utilized; at first, the parent CPU outputs a transmission signal. The child CPU receives the communication signal from the partner CPU and then performs driving so as to output the transmission signal; the parent CPU receives the transmission signal from the child CPU so that synchronization can be implemented by use of the transmission signal. In addition, the discrimination between the parent CPU and the child CPU can readily be implemented by recognizing the CPUs through pull-up and pull-down hardware configurations represented in FIG. 7. By use of the communication line, the number of input and output ports for the synchronization can be reduced.

Next, the sub-flow will be explained. FIG. 9A is a sub-flowchart representing the operation of the CPU in the electric driving apparatus according to Embodiment 2 of the present invention; FIG. 9B is a sub-flowchart representing the operation of the CPU in the electric driving apparatus according to Embodiment 2 of the present invention. The sub-flow represented in FIG. 9A is the same as that in FIG. 5A of Embodiment 1; in this sub-flow, outputting processing of the PWM is performed.

Next, in response to the input of the trigger signal, the child CPU starts this sub-flow; however, the parent CPU needs to count a time for outputting the trigger signal; FIG. 9B represents the flow. The sub-flow represented in FIG. 9B is processed in a period that is shorter than the period for the sub-flow represented in FIG. 9A, and is processed based on the first clock 10h and the second clock 10i represented in FIG. 7. In FIG. 9B, "1" is added to the first counter in the step S50. In the step S51, the first counter checks whether or not 50 [µs] has elapsed. In the case where 50 [µs] has elapsed (Y), it is checked whether or not the CPU is the parent CPU in the step S52. In the case where the CPU is the parent CPU (Y), the trigger signal is outputted in the step S54. After that, the value of the first counter is reset to "0". In the case where 50 [µs] has not elapsed (N) or in the case where the CPU is not the parent CPU (N), the trigger signal is turned off (not outputted) in the step S53.

In such a manner as described above, the counting of 50 [µs] is performed, and then the outputting processing of the trigger signal is implemented. It may be allowed that each of the parent and child CPUs performs the sub-flow represented in FIG. 9B; however, in the case where the two CPUs each have a single and the same program, it is required to check whether each of them is the parent CPU or the child CPU. In the case where the CPU is the parent CPU, the step S55 in the sub-flow represented in FIG. 9B is followed by the sub-flow represented in FIG. 9A. Moreover, when the two CPUs each need to measure another period that is longer than 50 [µs], each of them has a second counter (not represented), so that similar counting processing can be implemented.

The sub-flow in FIG. 10 represents interrupt processing that is started, for example, every 200 [µs], the respective counters for which are independently possessed by the two CPUs. The two CPUs may independently perform this interrupt processing; however, when performed based on the period of 50 [µs] represented in FIG. 9A or 9B, the period of the interrupt processing becomes integer-fold as large as this; thus, the respective interrupt processing steps of the two CPUs can be synchronized with each other. In FIG. 10, respective input information pieces are obtained in the step S30a. That is to say, as represented in FIG. 7, a vehicle speed, a torque sensor value, a current detection value, and rotation position information are obtained. Next, in the step S31, based on these information pieces, the control amount is calculated again, and the PWM duty value is stored.

In the case where a phase difference between the respective outputs of the first system and the second system is required, it is required to perform outputting with a predetermined phase difference. That is to say, it is checked whether the present system is the system of the parent CPU or the system of the child CPU. In the case where after the check, it is determined that the present system is the system of the parent CPU (Y), the value obtained in the step S31 is converted into a PWM value and is stored in the step S61. In contrast, in the case where the present system is the system of the child CPU (N), the step S60 is followed by the step S62. For example, in the case where the child CPU outputs the control amount with a phase difference of 180° from that of the parent CPU, a value obtained by making the calculated control amount include the phase difference of 180° is stored. After that, the main flow is resumed.

As the vehicle speed, there may be utilized a value that is inputted and stored in a longer period, as is obtained in each main flow in Embodiment 1. In FIG. 10, it is required to calculate and store the latest control amount; it may be allowed that for that purpose, the respective latest values of only the current value and the rotation position information are obtained.

As is the case with Embodiment 1, in order to perform synchronization with 50 [µs], which is the carrier period of the PWM, at least one system of a trigger signal is required; in comparison with Embodiment 1, the number of trigger signal systems can be reduced down to the minimum value; thus, the time management can rather readily be performed. It is made possible that two systems of trigger signals are provided and that the specific information (the current value and the rotation position), as the additional trigger signal, is synchronized and inputted.

As described above, only by synchronizing the outputting processing in the sub-flow, it is made possible to synchronize the two CPUs and to realize a predetermined phase difference; therefore, an apparatus with the configuration including two MPUs can readily be provided. Moreover, by inserting equivalent or slightly accuracy-inferior synchronization processing into the main flow, the two control units can be prevented from outputting control amounts that are largely different from each other in terms of time; thus, an abnormality caused by the difference of the respective information pieces held by the two CPUs can also be detected.

By applying synchronization to at least one of the outputs, a predetermined control specification can readily be realized, even in the case of a motor having consented-winding stator windings. In the case where one of the systems is abnormal, the other one of the systems, which is normal, can independently continue the control; depending on the state of the abnormality, it is conceivable that the abnormal system continues driving of only two phases among three phases. Even in that case, as is the case with normal-time control, the normal system can continue controlling with a predetermined phase difference. Here, there has been described the case where a concentrated-winding stator windings is utilized; however, it goes without saying that when the windings have substantially no electric coupling, for example, when the ratio of the mutual inductance to the self-inductance is the same as or smaller than ⅓, the same effect can be demonstrated.

It is not necessary that the first MPU 10a and the second MPU 10b are components independent from each other; it may be allowed that a single and the same package includes two independent CPUs, i.e., the first CPU 10c and the second CPU 10d. In the case of a multicore configuration, it may be allowed that when specific information is inputted from one of the CPUs to the other one of the CPUs and vice versa, the specific information is obtained not by use of the first DMA 10e and the second DMA 10f but through a memory that can commonly be accessed.

The foregoing electric driving apparatus and electric power steering apparatus according to any one of Embodiments 1 and 2 of the present invention are the ones in which at least any one of the following inventions is put into practice.

(1) An electric driving apparatus having an electric motor and a control unit for driving the electric motor,
wherein the electric motor has a single rotor and a stator having two independent groups of stator windings,
wherein the control unit includes an input circuit that inputs a plurality of information pieces to be utilized in calculation, two independent groups of output circuits for driving the two groups of stator windings, and two Micro Processing Units that outputs to the output circuits control signals based on control amounts calculated based on the information pieces inputted to the input circuit,
wherein the two groups of output circuits can supply electric currents to at least the two groups of stator windings of the electric motor or can cut off the supply of electric current,
wherein the two Micro Processing Units have respective CPUs, can communicate with each other, and have respective abnormality detection functions of detecting abnormalities in the two groups of output circuits and the two groups of stator windings; in the case where an abnormality in one of the two groups of output circuits or one of the two groups of stator windings is detected, control is continued by use of the other one of the two groups of output circuits or the other one of the two groups of stator, which is normal, and
wherein based on a trigger signal having a predetermined period, outputted from a trigger circuit, the respective CPUs included in the two Micro Processing Units synchronize at least control commands and output the synchronized control commands to the two groups of output circuits.

In the present invention, synchronization of the outputs prevents switching, at the timing of current detection, that is caused by a difference between the carriers of the two groups; thus, it is made possible to prevent noise from providing an effect to the current detection.

(2) The electric driving apparatus according to (1), wherein the control command is outputted in a period that is the same as that of a PWM signal for supplying an electric current to each of the two groups of stator windings.

In this invention, synchronization of the PWM outputs prevents switching noise from providing an effect to current detection.

(3) The electric driving apparatus according to any one of (1) and (2), wherein the trigger signal outputted from the trigger circuit is formed of a single clock signal; said trigger signal is created from a clock signal different from a clock signal for driving each of the CPUs or is created based on a clock signal periodically outputted from one of the CPUs.

In this invention, the trigger signal is created based on some sort of clock output signal, so that two groups can be synchronized with each other.

(4) The electric driving apparatus according to anyone of (1) through (3), wherein the control command is calculated every timer period created in such a way as to be integer-fold as large as the period of the trigger signal outputted from the trigger circuit and then is stored.

In this invention, calculation of the control command is synchronized with the period of a trigger signal, so that it is made possible to synchronize respective updates of the control commands in the two groups.

(5) The electric driving apparatus according to any one of (1) through (4),
wherein the respective CPUs each have a main flow to be processed in a predetermined period and a sub-flow to be processed in a predetermined period that is shorter than the predetermined period of the main flow, and
wherein in each processing according to the main flow and in each processing according to the sub-flow, the respective CPUs are synchronized with each other.

In this invention, the period of torque control performed in the main flow is longer than the period of current control performed in the sub-flow, so that stable torque control can be implemented.

(6) The electric driving apparatus according to any one of (1) through (5),
wherein there are provided a plurality of the trigger circuits, and
wherein among the plurality of information pieces inputted from the corresponding input circuits, specific information is synchronized with the trigger signal from the trigger circuit and is inputted to the respective CPUs, and then the respective CPUs each output a control command to the output circuit, based on the inputted specific information.

In this invention, the control commands are created by use of input signals that are synchronized with each other, so that the output signals obtained from the two MPUs can be synchronized.

(7) The electric driving apparatus according to anyone of (1) through (6), wherein the two Micro Processing Units each have an information input memory, take specific information among the plurality of information pieces into the information input memory every period, of a trigger signal, that is longer than the period of the trigger signal outputted from the trigger circuit to the output circuit, and output the control command to the output circuit every period, of a trigger circuit, that is the shortest, In this invention, calculation is performed by use of intermediate variables that are synchronized with each other, so that even when there exists interference between the two groups of coil windings, the output signals obtained from the two MPUs can be synchronized with each other.

(8) The electric driving apparatus according to any one of (1) through (6), wherein the two Micro Processing Units have a shared memory and take specific information among the plurality of information pieces into the shared memory.

In this invention, a shared memory is utilized and hence calculation is performed by use of input values that are synchronized with each other, so that even when there exists interference between the two groups of coil windings, the output signals obtained from the two MPUs can be synchronized with each other.

(9) The electric driving apparatus according to any one of (1) through (5), wherein the two groups of stator windings have substantially no electric coupling therebetween, and the stator windings are independently supplied with respective electric currents or the respective electric currents are independently stopped from being supplied.

In this invention, in the case where with a motor in which there exists substantially no interference between the groups, the outputs are synchronized with each other, a ripple can be suppressed by preventing switching noise from being superimposed on the current detection.

(10) The electric driving apparatus according to (9), wherein the two groups of stator windings are each formed in a concentrated-winding manner.

In this invention, in the case where with a concentrated winding in which there exists substantially no electric coupling, the outputs are synchronized with each other, a ripple can be suppressed by preventing switching noise from being superimposed on the current detection.

(11) The electric driving apparatus according to any one of (1) through (8), wherein the two groups of stator windings have electric coupling therebetween and are independently supplied with respective electric currents or the respective electric currents are independently stopped from being supplied.

In this invention, in the case where with a motor in which there exists interference between the groups, inputs are synchronized with each other and intermediate variables are synchronized with each other, non-interference control can normally be implemented.

(12) The electric driving apparatus according to (11), wherein the two groups of stator windings are each formed in a distributed-winding manner.

In this invention, in the case where with a distributed winding in which there exists electric coupling, inputs are synchronized with each other and intermediate variables are synchronized with each other, non-interference control can normally be implemented.

(13) A control device for an electric power steering apparatus,
wherein the electric power steering apparatus generates torque for assisting steering torque for a vehicle steering system, and
wherein the electric driving apparatus according to any one of claims 1 through 12 generates torque for assisting the steering torque.

In the case where this invention is applied to a vibration-sensitive electric power steering, an electric power steering apparats with a small ripple can be realized.

INDUSTRIAL APPLICABILITY

The present invention can be applied to the field of an electric driving apparatus, for example, as electric power steering apparatus that drives a driving subject by use of a motor, the field of the automobile industry, and the like.

DESCRIPTION OF REFERENCE NUMERALS

1: control unit
2: motor
2a: first stator winding
2b: second stator winding
3a: first inverter circuit
3b: second inverter circuit
3ap, 3bp: positive-polarity DC terminal
3an, 3bn: negative-polarity DC terminal
4: control circuit unit
30U, 30V, 30W, 35U, 35V, 35W: noise suppression capacitor
31U, 36U: U-phase upper arm switching device
31V, 36V: V-phase upper arm switching device
31W, 36W: W-phase upper arm switching device
32U, 37U: U-phase lower arm switching device
32V, 37V: V-phase lower arm switching device
32W, 37W: W-phase lower arm switching device
34U, 39U: U-phase motor relay switching device
34V, 39V: V-phase motor relay switching device
34W, 398: W-phase motor relay switching device
33U, 33V, 33W, 38U, 38V 38W: shunt resistor
33a: first current sensor
33b: second current sensor
21: slot
22: pole
15: notification means
16: notification output circuit
5a: first power-source relay
5b: second power-source relay
7: ignition switch
8: sensor
8a: vehicle speed sensor
9a: first rotation sensor
9b: second rotation sensor
10a: first MPU
10b: second MPU
10h: first clock
10i: second clock
10g: shared memory
11a: first driving circuit
11b: second driving circuit
12: input circuit
12a: first input circuit
12b: second input circuit
12c: third input circuit
12d: fourth input circuit
12e: fifth input circuit
12f: sixth input circuit
12g: seventh input circuit
17a: first trigger circuit
17b: second trigger circuit
17c: third trigger circuit
17d, 17e, 17f: line
17g: clock generator
13: power-supply circuit
14: communication line
20: stator
21: slot
22: magnet
23: rotor
24: output axle

The invention claimed is:
1. An electric driving apparatus having an electric motor and a control unit for driving the electric motor,
wherein the electric motor has a single rotor and a stator having two independent groups of stator windings,
wherein the control unit includes an input circuit that inputs a plurality of information pieces to be utilized in calculation, two independent groups of output circuits for driving the two groups of stator windings, and two Micro Processing Units that outputs to the output circuits control signals based on control amounts calculated based on the information pieces inputted to the input circuit, wherein the two groups of output circuits can supply electric currents to at least the two groups of stator windings of the electric motor or can cut off the supply of electric current, wherein the two Micro Processing Units have respective CPUs, can communicate with each other, and have respective abnormality detection functions of detecting abnormalities in the two groups of output circuits and the two groups of stator windings; in the case where an abnormality in one of the two groups of output circuits or one of the two groups of stator windings is detected, control is continued by use of the other one of the two groups of output circuits or the other one of the two groups of stator windings, which is normal, and wherein based on a trigger signal having a predetermined period, outputted from a trigger circuit, the respective CPUs included in the two Micro Processing Units synchronize at least control commands and output the synchronized control commands to the two groups of output circuits, wherein the trigger signal outputted from the trigger circuit is formed of a single clock signal, wherein the trigger signal is created from a clock signal different from a clock signal for driving each of the CPUs or is created based on a clock signal periodically outputted from one of the CPUs.

2. The electric driving apparatus according to claim 1, wherein the control command is outputted in a period that is the same as that of a PWM signal for supplying an electric current to each of the two groups of stator windings.

3. The electric driving apparatus according to claim 1, wherein there are provided a plurality of the trigger circuits, and wherein among the plurality of information pieces inputted from the corresponding input circuits, specific information is synchronized with the trigger signal from the trigger circuit and is inputted to the respective CPUs, and then the respective CPUs each output a control command to the output circuit, based on the inputted specific information.

4. The electric driving apparatus according to claim 1, wherein the two Micro Processing Units each have an information input memory, take specific information among the plurality of information pieces into the information input memory every period, of a trigger signal, that is longer than the period of the trigger signal outputted from the trigger circuit to the output circuit, and output the control command to the output circuit every period, of a trigger circuit, that is the shortest.

5. The electric driving apparatus according to claim 1, wherein the two Micro Processing Units have a shared memory and take specific information among the plurality of information pieces into the shared memory.

6. The electric driving apparatus according to claim 1, wherein the two groups of stator windings have substantially no electric coupling therebetween, and the stator windings are independently supplied with respective electric currents or the respective electric currents are independently stopped from being supplied.

7. The electric driving apparatus according to claim 6, wherein the two groups of stator windings are each formed in a concentrated-winding manner.

8. The electric driving apparatus according to claim 1, wherein the two groups of stator windings have electric coupling therebetween and are independently supplied with respective electric currents or the respective electric currents are independently stopped from being supplied.

9. The electric driving apparatus according to claim 8, wherein the two groups of stator windings are each formed in a distributed-winding manner.

10. A control device for an electric power steering apparatus, wherein the electric power steering apparatus generates torque for assisting steering torque for a vehicle steering system, and wherein the electric driving apparatus according to claim 1 generates torque for assisting the steering torque.

11. An electric driving apparatus having an electric motor and a control unit for driving the electric motor, wherein the electric motor has a single rotor and a stator having two independent groups of stator windings, wherein the control unit includes an input circuit that inputs a plurality of information pieces to be utilized in calculation, two independent groups of output circuits for driving the two groups of stator windings, and two Micro Processing Units that outputs to the output circuits control signals based on control amounts calculated based on the information pieces inputted to the input circuit, wherein the two groups of output circuits can supply electric currents to at least the two groups of stator windings of the electric motor or can cut off the supply of electric current, wherein the two Micro Processing Units have respective CPUs, can communicate with each other, and have respective abnormality detection functions of detecting abnormalities in the two groups of output circuits and the two groups of stator windings; in the case where an abnormality in one of the two groups of output circuits or one of the two groups of stator windings is detected, control is continued by use of the other one of the two groups of output circuits or the other one of the two groups of stator windings, which is normal, and wherein based on a trigger signal having a predetermined period, outputted from a trigger circuit, the respective CPUs included in the two Micro Processing Units synchronize at least control commands and output the synchronized control commands to the two groups of output circuits, wherein the control command is calculated every timer period created in such a way as to be integer-fold as large as the period of the trigger signal outputted from the trigger circuit and then is stored.

12. An electric driving apparatus having an electric motor and a control unit for driving the electric motor, wherein the electric motor has a single rotor and a stator having two independent groups of stator windings, wherein the control unit includes an input circuit that inputs a plurality of information pieces to be utilized in calculation, two independent groups of output circuits for driving the two groups of stator windings, and two Micro Processing Units that outputs to the output circuits control signals based on control amounts calculated based on the information pieces inputted to the input circuit, wherein the two groups of output circuits can supply electric currents to at least the two groups of stator windings of the electric motor or can cut off the supply of electric current, wherein the two Micro Processing Units have respective CPUs, can communicate with each other, and have respective abnormality detection functions of detecting abnormalities in the two groups of output circuits and the two groups of stator windings; in the case where an abnormality in one of the two groups of output circuits or one of the two groups of stator windings is detected, control is continued by use of the other one of the two groups of output circuits or the other one of the two groups of stator windings, which is normal, and wherein based on a trigger signal having a predetermined period, outputted from a trigger circuit, the respective CPUs included in the two Micro Processing Units synchronize at least control commands and output the synchronized control commands to the two groups of output circuit, wherein the respective CPUs each have a main flow to be processed in a predetermined period and a sub-flow to be processed in a predetermined period that is shorter than the predetermined period of the main flow, and wherein in each processing according to the main flow and in each processing according to the sub-flow, the respective CPUs are synchronized with each other.

* * * * *